US012482596B2

(12) United States Patent
Yoshioka

(10) Patent No.: US 12,482,596 B2
(45) Date of Patent: Nov. 25, 2025

(54) INDUCTOR COMPONENT

(71) Applicant: Murata Manufacturing Co., Ltd., Kyoto-fu (JP)

(72) Inventor: Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1098 days.

(21) Appl. No.: 17/410,039

(22) Filed: Aug. 24, 2021

(65) Prior Publication Data

US 2022/0068555 A1 Mar. 3, 2022

(30) Foreign Application Priority Data

Aug. 26, 2020 (JP) .................................. 2020-142762

(51) Int. Cl.
| | | |
|---|---|---|
| H01F 27/29 | (2006.01) | |
| H01F 27/28 | (2006.01) | |
| H01F 27/32 | (2006.01) | |

(52) U.S. Cl.
CPC ....... H01F 27/292 (2013.01); H01F 27/2823 (2013.01); H01F 27/324 (2013.01)

(58) Field of Classification Search
CPC .. H01F 27/292; H01F 27/2823; H01F 27/324; H01F 17/0013; H01F 2017/0066; H01F 2017/0073
USPC ...................................................... 336/192
See application file for complete search history.

(56) References Cited

U.S. PATENT DOCUMENTS

| | | | |
|---|---|---|---|
| 11,289,265 B2* | 3/2022 | Matsumoto | ............. H01F 17/04 |
| 2014/0009254 A1* | 1/2014 | Ohkubo | .............. H01F 17/0033 336/192 |
| 2022/0310311 A1* | 9/2022 | Tominaga | ........... H01F 17/0013 |

FOREIGN PATENT DOCUMENTS

| | | |
|---|---|---|
| CN | 110942904 A | 3/2020 |
| JP | 2010-123865 A | 6/2010 |
| JP | 2012-256758 A | 12/2012 |
| JP | 2017-103354 A | 6/2017 |
| JP | 2020-053483 A | 4/2020 |

* cited by examiner

Primary Examiner — Tuyen T Nguyen
(74) Attorney, Agent, or Firm — Studebaker Brackett PLLC

(57) ABSTRACT

An inductor component that causes no electric current to be flowed between external terminals until the inductor component is mounted on a substrate, for example, and includes an element body and an inductor wire that extends in the inside of the element body. To the inductor wire, a first vertical wire is connected. The top surface of the first vertical wire is exposed from the principal surface of the element body. On the top surface of the first vertical wire, a first external terminal is stacked. The first external terminal has a first conducting portion and a first insulating portion. The first conducting portion is insulated from the outside of the element body by the first insulating portion.

20 Claims, 19 Drawing Sheets

INDUCTOR COMPONENT

CROSS-REFERENCE TO RELATED APPLICATION

This application claims benefit of priority to Japanese Patent Application No. 2020-142762, filed Aug. 26, 2020, the entire content of which is incorporated herein by reference.

BACKGROUND

Technical Field

The present disclosure relates to an inductor component.

Background Art

An electronic component described in Japanese Patent Application Laid-Open No. 2012-256758 has a principal surface, and includes a rectangular element body. On both the sides of the element body in the long-side direction, an external terminal is stacked. Because of the stack, the external terminal is a so-called five face electrode. Of an external terminal covering a principal surface of the element body and a side surface orthogonal to the end face of the element body, the surface of the external terminal covering the side surface is covered with an insulating layer for insulation.

SUMMARY

In the electronic component described in Japanese Patent Application Laid-Open No. 2012-256758, although a part of the external terminal is covered with the insulating layer, most of the external terminal is exposed. That is, in the state before the electronic component is mounted on a substrate, for example, the insulating properties of the electronic component are insufficient. Therefore, for example, there is a concern that an electric current is flowed through the inside of the electronic component due to static electricity, for example, in storage of the electronic component and the internal structure in the inside of the electronic component is broken.

Accordingly, an aspect of the present disclosure is an inductor component including an element body having a principal surface; an inductor wire extending in parallel with the principal surface in an inside of the element body; a vertical wire extending from the inductor wire in a thickness direction orthogonal to the principal surface, the vertical wire being exposed from the principal surface; and an external terminal disposed on a part exposed from the principal surface of the vertical wire, the external terminal being exposed outward solely on the principal surface. The external terminal has a conducting portion including a metal, an insulating portion covering the conducting portion, the insulating portion having an insulating property higher than an insulating property of the conducting portion. The conducting portion is insulated from an outside of the element body by the insulating portion.

According to the configuration described above, the surface of the external terminal is insulated with an insulating portion. Therefore, it is possible to prevent the electric current from being flowed between the external terminals until the inductor component is mounted on the substrate, for example.

There is provided an inductor component that causes no electric current to be flowed between external terminals until the inductor component is mounted on a substrate, for example.

DETAILED DESCRIPTION

First Embodiment

In the following, a first embodiment according to an inductor component will be described. It should be noted that the drawings sometimes show components in scaling up for easy understanding. The dimensions and ratios of the components sometimes different from those in other drawing.

Figure 1:
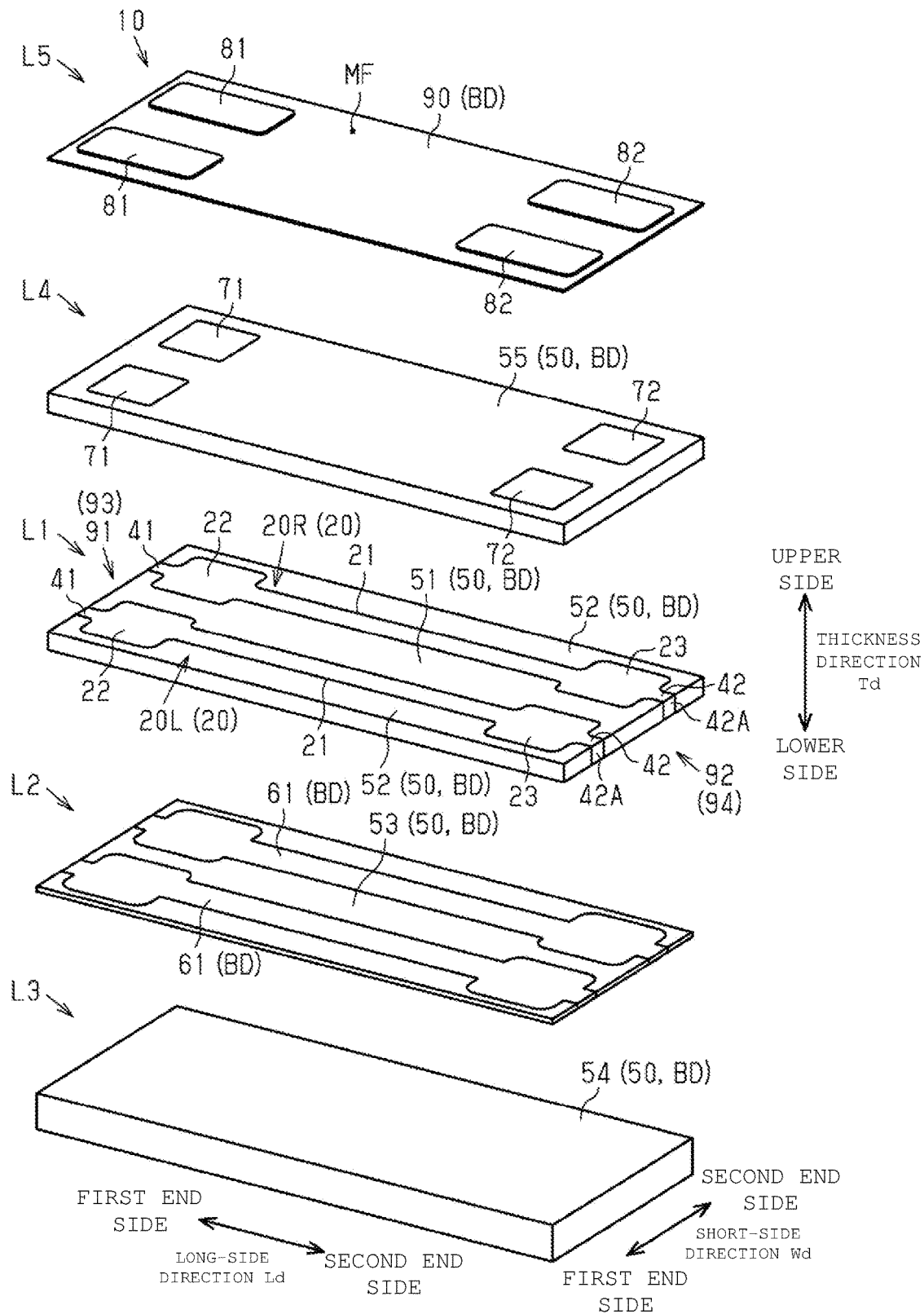
FIG. 1 is an exploded perspective view of an inductor component according to a first embodiment.

As shown in FIG. 1, an inductor component 10 has a structure such that five layers are stacked in a thickness direction Td as a whole. It should be noted that in the following description, one side in the thickness direction Td is defined as the upper side and the opposite side of the one side is defined as the lower side.

A first layer L1 is composed of two inductor wires 20, first support wires 41 individually extending from the inductor wires 20, a second support wire 42, an inner magnetic path 51, and an outer magnetic path 52. It should be noted that in the following description, these two inductor wires 20 have to distinguish from each other, one inductor wire 20 is referred to as a first inductor wire 20R, and another inductor wire 20 is referred to as a second inductor wire 20L.

The first layer L1 is in a rectangular shape when viewed from the thickness direction Td. It should be noted that a direction in parallel with the long side of the rectangle is a long-side direction Ld, and a direction in parallel with the short side is a short-side direction Wd.

The inductor wire 20 is composed of the wire main body 21 that linearly extends, and a first pad 22 and a second pad 23 individually provided at the end portions of the wire main body 21.

The wire main body 21 extends in the long-side direction Ld of the first layer L1. In the wire main body 21, the first pad 22 is connected to the first end on the first end side in the long-side direction Ld. It should be noted that the first end on the first end side in the long-side direction Ld in the wire main body 21 may be enlarged such that the first end is more widened than is the center part of the wire main body 21 in the long-side direction Ld.

The dimension of the first pad 22 in the short-side direction Wd is larger than the dimension of the wire main body 21 in the short-side direction Wd. The first pad 22 is in a nearly square shape when viewed from the thickness direction Td.

In the wire main body 21, to the second end on the second end side in the long-side direction Ld, the second pad 23 is connected. It should be noted that the second end on the second end side in the long-side direction Ld in the wire main body 21 may be enlarged such that the second end is more widened than is the center part of the wire main body 21 in the long-side direction Ld.

The inductor wire 20 is made of a conductive material. In the present embodiment, the inductor wire 20 can have a composition in which the ratio of copper is 99 wt % or more and the ratio of sulfur is 0.1 wt % or more 1.0 wt % or less (i.e., from 0.1 wt % to 1.0 wt %).

In the first layer L1, from the first pad 22 on the opposite side of the wire main body 21, a first support wire 41 extends. That is, the first support wire 41 extends from the edge of the first pad 22 on the first end side in the long-side direction Ld. The first support wire 41 linearly extends in parallel with the long-side direction Ld. The first support wire 41 extends to a first side surface 91 on the first end side in the long-side direction Ld of the first layer L1, and is exposed from the first side surface 91. It should be noted that two first support wires 41 are present corresponding to the number of the inductor wires 20, and these two first support wires 41 are exposed from the first side surface 91.

Similarly, in the first layer L1, from the second pad 23 on the opposite side of the wire main body 21, a second support wire 42 extends. That is, the second support wire 42 extends from the edge of the second pad 23 on the second end side in the long-side direction Ld. The second support wire 42 linearly extends in parallel with the long-side direction Ld. The second support wire 42 extends to a second side surface 92 on the second end side in the long-side direction Ld of the first layer L1, and is exposed from the second side surface 92. It should be noted that two second support wires 42 are present corresponding to the number of the inductor wires 20, and these two second support wires 42 are exposed from the second side surface 92.

The materials of the first support wire 41 and the second support wire 42 are conductive material the same as the material of the inductor wire 20. However, in the first support wire 41, a part including an exposed surface 41A exposed from the first side surface 91 is a Cu oxide. Similarly, in the second support wire 42, a part including an exposed surface 42A exposed from the second side surface 92 is a Cu oxide.

Figure 2:
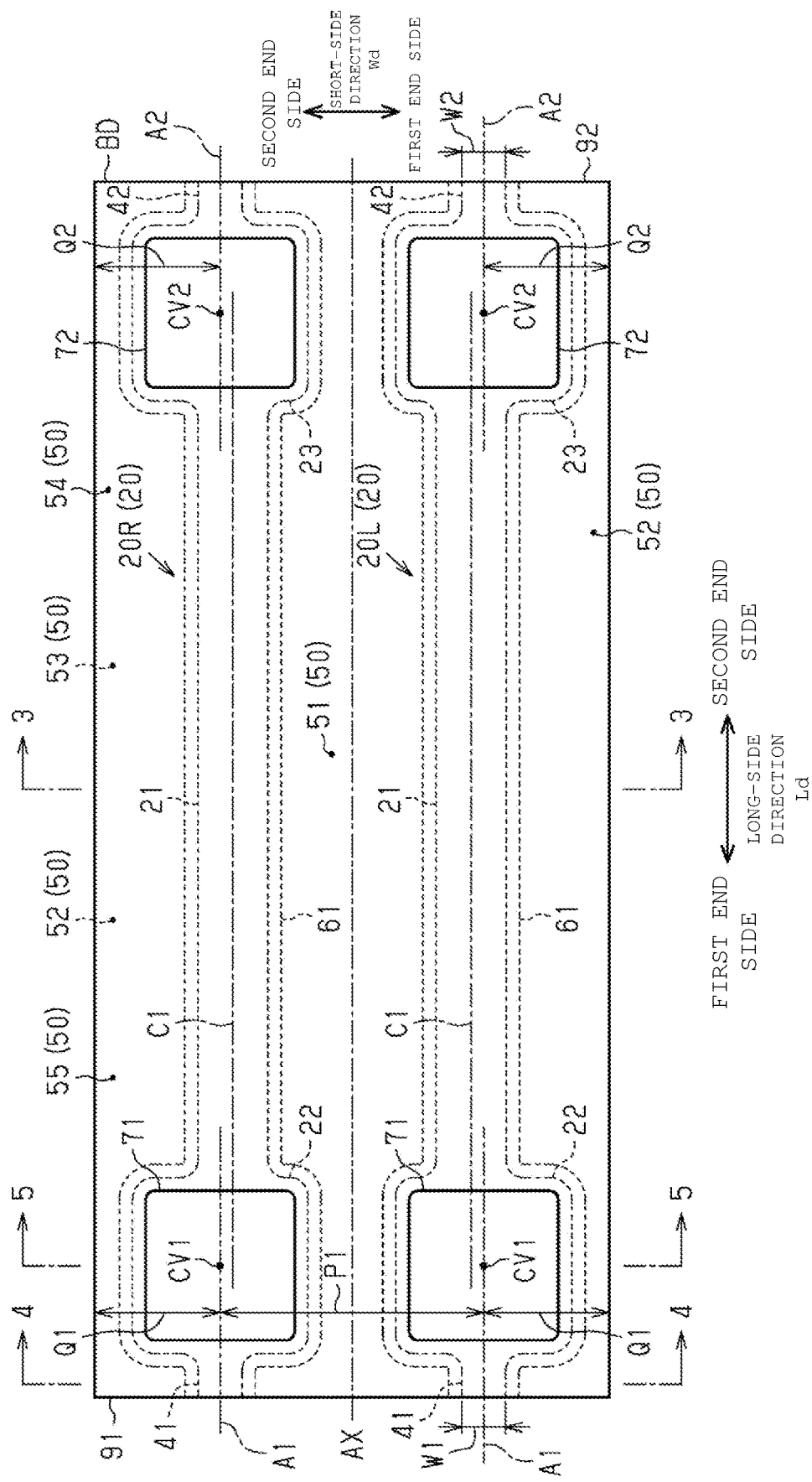
FIG. 2 is a transparent top view of the inductor component according to the first embodiment except a fifth layer.

As shown in FIG. 2, when a straight line passing the center in the short-side direction Wd of the first layer L1 and extending in the long-side direction Ld is a symmetry axis AX, the two inductor wires 20, the first support wires 41 and the second support wires 42 individually extending from the inductor wires are disposed in line symmetry relative to the symmetry axis AX. That is, the two inductor wires 20 is present on the same plane. In this embodiment, the first support wire 41 extending from the first inductor wire 20R, and the second support wire 42 extending from the first inductor wire 20R are located on the second end side in the short-side direction Wd from the symmetry axis AX. The first support wire 41 extending from the second inductor wire 20L, and the second support wire 42 extending from the second inductor wire 20L are located on the first end side in the short-side direction Wd from the symmetry axis AX.

As shown in FIG. 1, in the first layer L1, the region between the first inductor wire 20R and the second inductor wire 20L is an inner magnetic path 51. The material of the inner magnetic path 51 is a magnetic material. Specifically, the material of the inner magnetic path 51 is a resin containing metal magnetic powder. In this embodiment, the metal magnetic powder is an organic resin containing metal magnetic powder made of an Fe-based alloy or an amorphous alloy. More specifically, the metal magnetic powder is an FeSiCr-based metal powder containing iron. The mean particle size of the metal magnetic powder can be approximately five micrometers.

It should be noted that in this embodiment, the particle size of the metal magnetic powder is the longest length of a line drawn from the edge to the edge in the sectional form the metal magnetic powder appearing in a section of the inner magnetic path 51 that is cut. The mean particle size is the mean of the particle sizes of the metal magnetic powder at three or more random points in the metal magnetic powder appearing in the section of the inner magnetic path 51 that is cut.

In the first layer L1, when viewed from the thickness direction Td, the region on the second end side in the short-side direction Wd from the first inductor wire 20R and the region on the first end side in the short-side direction Wd from the second inductor wire 20L are the outer magnetic path 52. The material of the outer magnetic path 52 is a magnetic material the same as the material of the inner magnetic path 51.

In the present embodiment, the dimension of the first layer L1 in the thickness direction Td, i.e., the dimensions of the inductor wire 20, the first support wire 41, and the second support wire 42 in the thickness direction Td can be approximately 40 micrometers.

On the under surface that is the surface of the first layer L1 on the lower side in the thickness direction Td, a second layer L2 in a rectangular shape the same as the shape of the first layer L1 when viewed from the thickness direction Td is stacked. The second layer L2 is composed of two insulating resins 61 and an insulating resin magnetic layer 53.

The insulating resin 61 covers the inductor wire 20, the first support wire 41, and the second support wire 42 from the lower side in the thickness direction Td. The insulating resin 61 is in a shape that covers a range slightly wider than the outer edges of the inductor wire 20, the first support wire 41, and the second support wire 42 when viewed from the thickness direction Td. As a result, the insulating resin 61 is in a belt shape extending in the long-side direction Ld of the second layer L2 as a whole. The material of the insulating resin 61 is an insulating resin, and in this embodiment, the material can be a polyimide-based resin, for example. The insulating resin 61 has insulating properties higher than those of those of the inductor wire 20. Two insulating resins 61 are provided side by side corresponding to the number and the arrangement of the inductor wires 20 in the short-side direction Wd.

In the second layer L2, parts except the two insulating resins 61 are the insulating resin magnetic layer 53. The material of the insulating resin magnetic layer 53 is a magnetic material the same as the materials of the inner magnetic path 51 and the outer magnetic path 52 described above.

On the under surface that is the surface of the second layer L2 on the lower side in the thickness direction Td, a third layer L3 in a rectangular shape the same as the shape of the second layer L2 when viewed from the thickness direction Td is stacked. The third layer L3 is a first magnetic layer 54. Therefore, the first magnetic layer 54 is disposed on the lower side from the inductor wire 20. The material of the first magnetic layer 54 is an organic resin containing metal magnetic powder the same as the materials of the inner magnetic path 51, the outer magnetic path 52, and the insulating resin magnetic layer 53.

On the other hand, on the top surface that is the surface of the first layer L1 on the upper side in the thickness direction Td, a fourth layer L4 in a rectangular shape the same as the shape of the first layer L1 when viewed from the thickness direction Td is stacked. The fourth layer L4 is composed of two first vertical wires 71, two second vertical wires 72, and a second magnetic layer 55.

The first vertical wire 71 is directly connected to the top surface of the first pad 22 of the inductor wire 20 with no other layer interposed therebetween. That is, to the first pad 22, the first vertical wire 71, the first end of the wire main body 21 and the first support wire 41 are connected.

The material of the first vertical wire 71 is a material the same as the material of the inductor wire 20. The first vertical wire 71 is in a regular quadrangular prism shape, and the axial direction of the regular quadrangular prism is matched with the thickness direction Td.

As shown in FIG. 2, when viewed from the thickness direction Td, the dimensions of the edges of the first vertical wire 71 in a square shape are slightly smaller than the dimensions of the edges of the first pad 22 in a square shape. Therefore, the area of the first pad 22 is larger than the area of the first vertical wire 71 at the connecting site to the first pad 22. It should be noted that when viewed from the upper side in the thickness direction Td, a center axis CV1 of the first vertical wire 71 is matched with the geometric center of the first pad 22 in a nearly square shape. Two first vertical wires 71 are provided corresponding to the number of the inductor wires 20.

As shown in FIG. 1, the second vertical wire 72 is directly connected to the top surface of the second pad 23 of the inductor wire 20 with no other layer interposed therebetween. That is, to the second pad 23, the second vertical wire 72, the second end of the wire main body 21, and the second support wire 42 are connected.

The material of the second vertical wire 72 is a material the same as the material of the inductor wire 20. The second vertical wire 72 is in a regular quadrangular prism shape, and the axial direction of the regular quadrangular prism is matched with the thickness direction Td.

As shown in FIG. 2, when viewed from the thickness direction Td, the dimensions of the edges of the second vertical wire 72 in a square shape are slightly smaller than the dimensions of the edges of the second pad 23 in a square shape. Therefore, the area of the second pad 23 is larger than the area of the second vertical wire 72 at the connecting site to the second pad 23. It should be noted that when viewed from the upper side in the thickness direction Td, a center axis CV2 of the second vertical wire 72 is matched with the geometric center of the second pad 23 in a nearly square shape. Two second vertical wires 72 are provided corresponding to the number of the inductor wires 20.

As shown in FIG. 1, in the fourth layer L4, parts except the two first vertical wires 71 and the two second vertical wires 72 are the second magnetic layer 55. Therefore, the second magnetic layer 55 is stacked on the top surfaces of the inductor wires 20 and the support wires 41 and 42. That is, the support wires 41 and 42 are directly in contact with the second magnetic layer 55. The material of the second magnetic layer 55 is a material the same as the material of the first magnetic layer 54 described above.

In the inductor component 10, the magnetic layer 50 is composed of the inner magnetic path 51, the outer magnetic path 52, the insulating resin magnetic layer 53, the first magnetic layer 54, and the second magnetic layer 55. The inner magnetic path 51, the outer magnetic path 52, the insulating resin magnetic layer 53, the first magnetic layer 54, and the second magnetic layer 55 are connected to each other, and surround the inductor wires 20. As described above, the magnetic layer 50 forms a closed magnetic circuit to the inductor wires 20. Therefore, the inductor wires 20 extend in the inside of magnetic layer 50. It should be noted that although the inner magnetic path 51, the outer magnetic path 52, the insulating resin magnetic layer 53, the first magnetic layer 54, and the second magnetic layer 55 are shown separately, these components are integrated as the magnetic layer 50, and a boundary is sometimes not confirmed.

On the top surface that is the surface of the fourth layer L4 on the upper side in the thickness direction Td, a fifth layer L5 in a rectangular shape the same as the shape of the fourth layer L4 when viewed from the thickness direction Td is stacked. The fifth layer L5 is composed of two first external terminals 81, two second external terminals 82, and an insulating layer 90.

The first external terminal 81 is directly connected to the top surface of the first vertical wire 71 with no other layer interposed therebetween. Therefore, the first external terminal 81 is disposed on the top surface of the first vertical wire 71. The first external terminal 81 is in a rectangular shape when viewed from the thickness direction Td, and is also located on the second magnetic layer 55. The long side of the rectangle of the first external terminal 81 extends in parallel with the long-side direction Ld of the fifth layer L5, and the short side extends in parallel with the short-side direction Wd of the fifth layer L5. Two first external terminals 81 are provided corresponding to the number of the inductor wires 20.

The second external terminal 82 is directly connected to the top surface of the second vertical wire 72 with no other layer interposed therebetween. Therefore, the second external terminal 82 is disposed on the top surface of the second vertical wire 72. The second external terminal 82 is in a rectangular shape when viewed from the thickness direction Td, and is also located on the second magnetic layer 55. The long side of the rectangle of the second external terminal 82 extends in parallel with the long-side direction Ld of the fifth layer L5, and the short side extends in parallel with the short-side direction Wd of the fifth layer L5.

In the fifth layer L5, parts except the two first external terminals 81 and the two second external terminals 82 are the insulating layer 90. In other words, in the top surface of the fourth layer L4, the range that is not covered with the two first external terminals 81 and the two second external terminals 82 is covered with the insulating layer 90 of the fifth layer L5. When viewed from the thickness direction Td, the outer edges of the first external terminals 81 and the outer edges of the second external terminals 82 are in contact with the insulating layer 90. The insulating layer 90 has the insulating properties higher than those of the magnetic layer 50, and in the present embodiment, the insulating layer 90 is a solder resist. The dimension of the insulating layer 90 in the thickness direction Td is smaller than the dimensions of the first external terminal 81 and the second external terminal 82 in the thickness direction Td.

In the present embodiment, an element body BD is composed of the magnetic layer 50, the insulating resin 61, and the insulating layer 90. Therefore, the element body BD is in a rectangular parallelepiped shape. In the present embodiment, the dimension of the element body BD in the thickness direction Td is approximately 0.2 mm, for example. The element body BD is parts except wires and terminals having electrical conductivity in the inductor component 10, and parts having insulating properties. The shape of the element body BD is in a rectangular parallelepiped shape as described above, except locally projecting members. It should be noted that when the shape of the element body BD is in a rectangular parallelepiped shape, the stacked parts are included in the element body BD.

In the surface of the element body BD, the surface of the insulating layer 90 on the upper side in the thickness direction Td is a principal surface MF. Therefore, the inductor wire 20 extends in parallel with the principal surface MF of the element body BD. The first vertical wire 71 extends in the thickness direction Td from the first pad 22 of the inductor wire 20 toward the principal surface MF. The first vertical wire 71 is exposed from the principal surface MF. The second vertical wire 72 extends in the thickness direction Td from the second pad 23 of the inductor wire 20 toward the principal surface MF. The second vertical wire 72 is exposed from the principal surface MF. It should be noted that at least parts of the surfaces of the first vertical wire 71 and the second vertical wire 72 exposed from the principal surface MF are sometimes covered with the first external terminal 81 and the second external terminal 82 like the present embodiment.

The first external terminals 81 and the second external terminal 82 are exposed from the principal surface MF on the upper side in the thickness direction Td. When viewed from the thickness direction Td, the outer edges of the first external terminals 81 and the outer edges of the second external terminal 82 are disposed in the range of the principal surface MF. That is, the first external terminals 81 and the second external terminal 82 are exposed from the principal surface MF solely to the outer side of the element body BD in the surfaces of the element body BD.

The element body BD has a first side surface 93 vertical to the principal surface MF. It should be noted that the first side surface 91 of the first layer L1 is a part of the first side surface 93 of the element body BD. The element body BD has a second side surface 94 that is a side surface vertical to the principal surface MF and in parallel with the first side surface 93. It should be noted that the second side surface 92 of the first layer L1 is a part of the second side surface 94 the element body BD. That is, the first support wire 41 extends from the inductor wire 20 in parallel with the principal surface MF, and the end portion is exposed from the first side surface 93 of the element body BD. Similarly, the second support wire 42 extends from the inductor wire 20 in parallel with the principal surface MF, and the end portion is exposed from the second side surface 94 the element body BD.

Next, the wires will be described in detail.

As shown in FIG. 2, when viewed from the thickness direction Td, center axes C1 of the two wire main bodies 21 extend in the long-side direction Ld in parallel with each other. It should be noted that the center axis C1 of the wire main body 21 is a line that follows the intermediate points of the wire main body 21 in the direction orthogonal to the direction in which the wire main body 21 extends, i.e., in the short-side direction Wd. The line width of the wire main bodies 21, i.e., the dimension in the short-side direction Wd can be 50 micrometers. In the following description, in the short-side direction Wd, a distance from the center axis C1 of the wire main body 21 of the first inductor wire 20R to the center axis C1 of the wire main body 21 of the second inductor wire 20L is set to the pitch between the wire main bodies 21. In the present embodiment, the pitch between the wire main bodies 21 is approximately 250 micrometers, for example. The gap between the wire main bodies 21 adjacent to each other, i.e., the distance between the wire main body 21 of the first inductor wire 20R on the first end side in the short-side direction Wd and the wire main body 21 of the second inductor wire 20L on the second end side in the short-side direction Wd shown in FIG. 2 is approximately 200 micrometers, for example. It should be noted that in the present embodiment, the minimum gap between the inductor wires 20 adjacent to each other is the gap between the first pads 22 and the gap between the second pads 23, and these gaps are both 50 micrometers or more. For example, the gap between the first pads 22 and the gap between the second pads 23 may be approximately 110 micrometers.

A center axis A1 of the first support wire 41 is extends in the long-side direction Ld. It should be noted that the center axis A1 of the first support wire 41 is a line that follows the intermediate points of the first support wire 41 in the direction orthogonal to the direction in which the first support wire 41 extends, i.e., in the short-side direction Wd.

The center axis A1 of the first support wire 41 is located on the outer side in the short-side direction Wd from the center axis C1 of the wire main body 21. That is, the center axis A1 of the first support wire 41 is not matched with the center axis C1 of the wire main body 21. Therefore, the center axis A1 of the first support wire 41 is located on a different straight line from the center axis C1 of the wire main body 21. The extension line of the center axis A1 of the first support wire 41 intersects with the center axis CV1 of the first vertical wire 71.

A center axis A2 of the second support wire 42 is extends in the long-side direction Ld. It should be noted that the center axis A2 of the second support wire 42 is a line that follows the intermediate points of the second support wire 42 in the direction orthogonal to the direction in which the second support wire 42 extends, i.e., in the short-side direction Wd.

The center axis A2 of the second support wire 42 is located on the outer side in the short-side direction Wd from the center axis C1 of the wire main body 21. That is, the center axis A2 of the second support wire 42 is not matched with the center axis C1 of the wire main body 21. Therefore, the center axis A2 of the second support wire 42 is located on a different straight line from the center axis C1 of the wire main body 21. The extension line of the center axis A2 of the second support wire 42 intersects with the center axis CV2 of the second vertical wire 72.

The first support wire 41 and the second support wire 42 extending from the same inductor wire 20 are disposed at the same location in the short-side direction Wd. That is, the center axis A1 of the first support wire 41 and the center axis A2 of the second support wire 42 are located on the same straight line. It should be noted that in the present application, when a displacement is within 10% based on the minimum line width of the inductor wire 20, the center axes A1 and A2 are regarded as located on the same straight line. Specifically, the minimum line width of the inductor wire 20 in the present embodiment can be 50 micrometers that is the line width of the wire main body 21. Therefore, the term "located on the same straight line" in the present embodiment means the case in which the shortest distance between two axes is within five micrometers, and the term "located on the different straight line" means the case in which the shortest distance between two axes exceeds five micrometers.

As described above, in the first layer L1, the inductor wires 20, the first support wire 41, and the second support wires 42 are disposed in line symmetry relative to the symmetry axis AX. Therefore, as shown in FIG. 2, a distance Q1 from the end of the element body BD on the second end side in the short-side direction Wd to the center axis A1 of the first support wire 41 extending from the first inductor wire 20R is equal to a distance Q1 from the end of the element body BD on the first end side in the short-side direction Wd to the center axis A1 of the first support wire 41 extending from the second inductor wire 20L.

Similarly, a distance Q2 from the end of the element body BD on the second end side in the short-side direction Wd to the center axis A2 of the second support wire 42 extending from the first inductor wire 20R is equal to a distance Q2 from the end of the element body BD on the first end side in the short-side direction Wd to the center axis A2 of the second support wire 42 extending from the second inductor wire 20L. Since the center axis A1 of the first support wire 41 and the center axis A2 of the second support wire 42 are on the same straight line, the distance Q1 is equal to the distance Q2.

On the other hand, in the present embodiment, a pitch P1 from the center axis A1 of the first support wire 41 extending from the first inductor wire 20R to the center axis A1 of the first support wire 41 extending from the second inductor wire 20L in the short-side direction Wd is larger than the distance Q1 and the distance Q2 described above. Specifically, the pitch P1 is a length approximately twice the distance Q1 and the distance Q2.

Figure 3:
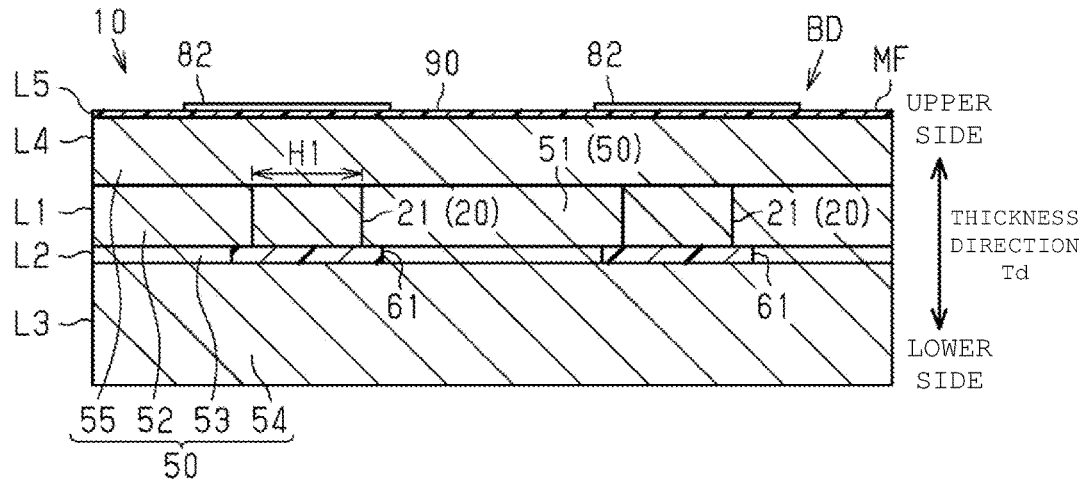
FIG. 3 is a sectional view of the inductor component taken along line 3-3 in FIG. 2.
Figure 4:
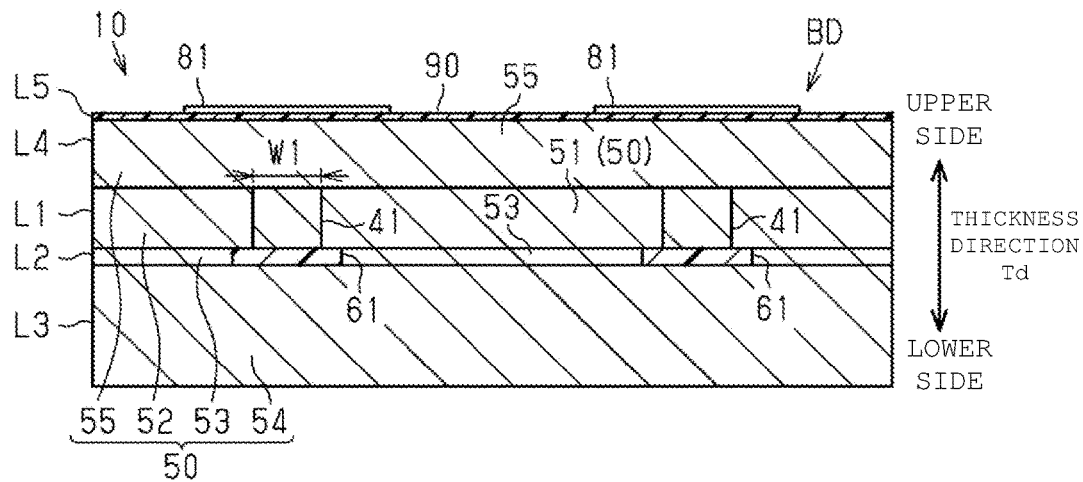
FIG. 4 is a sectional view of the inductor component taken along line 4-4 in FIG. 2.

As shown in FIGS. 3 and 4, a wire width W1 of the first support wire 41 in the short-side direction Wd is smaller than a wire width H1 of the wire main body 21 of the inductor wire 20 in the short-side direction Wd. Here, the first support wire 41 and the wire main body 21 of the inductor wire 20 are provided on the same first layer L1, and the length in the thickness direction Td is almost the same. Therefore, the sectional areas of the first support wires 41 are smaller than the sectional areas of the wire main bodies 21 in the reflection of the difference in the wire width. Similarly, as shown in FIGS. 2 and 3, the wire widths W2 of the second support wires 42 in the short-side direction Wd are smaller than the wire width H1 of the wire main body 21 of the inductor wire 20 in the short-side direction Wd Therefore, the sectional areas of the second support wires 42 are smaller than the sectional areas of the wire main bodies 21 in the reflection of the difference in the wire width.

Figure 5:
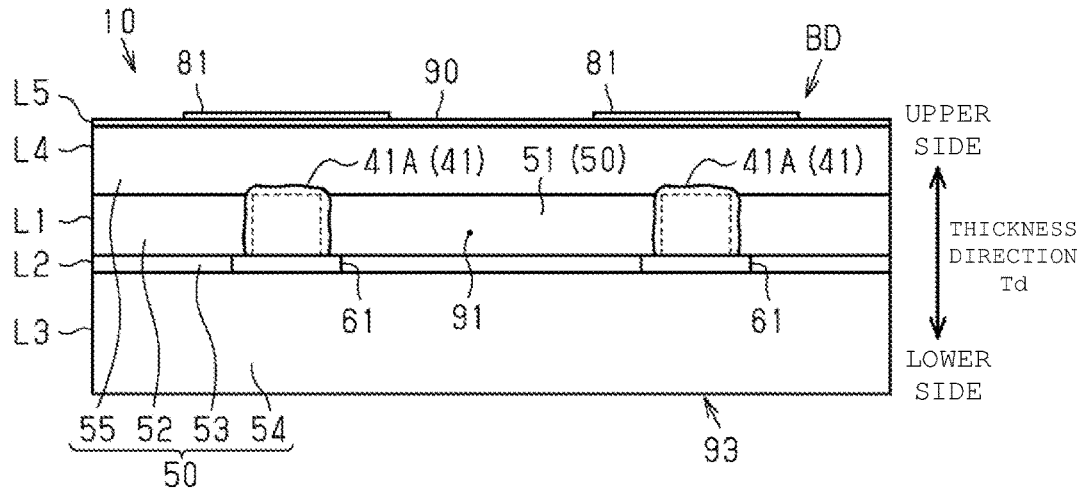
FIG. 5 is a side view showing the first side surface of the inductor component according to the first embodiment.

As shown in FIG. 5, from the first side surface 93 of the element body BD on the first end side in the long-side direction Ld, the ends of the two first support wires 41 are exposed. The shapes of the exposed surfaces 41A of the first support wires 41 exposed from the first side surface 93 are in a shape slightly stretching the sectional form of the first support wire 41 orthogonal to the center axis A1. As a result, the area of the exposed surface 41A of the first support wire 41 is larger than the sectional area of the first support wire 41 in the inside of the element body BD in the section orthogonal to the center axis A1. Similarly, as shown in FIG. 1, the two second support wires 42 are both exposed from the second side surface 94 of the element body BD on the second end side in the long-side direction Ld. The area of the exposed surface 42A exposed from the second side surface 94 on the second support wire 42 is larger than the sectional area of the second support wire 42 in the inside of the element body BD in the section orthogonal to the center axis A2. Thus, the first support wire 41 has an increased contact area with the first side surface 93 of the element body BD, the second support wire 42 has an increased contact area with the second side surface 94 of the element body BD, and the close contact property of the support wires 41 and 42 to the element body BD is improved. It should be noted that the size of the sectional area only has to satisfy the relationship above, and for example, the exposed surface 41A may be in a shape in which the exposed surface 41A extends to one side and another side is covered with the extending part of the element body BD.

Next, the external terminal will be described in detail.

Figure 6:
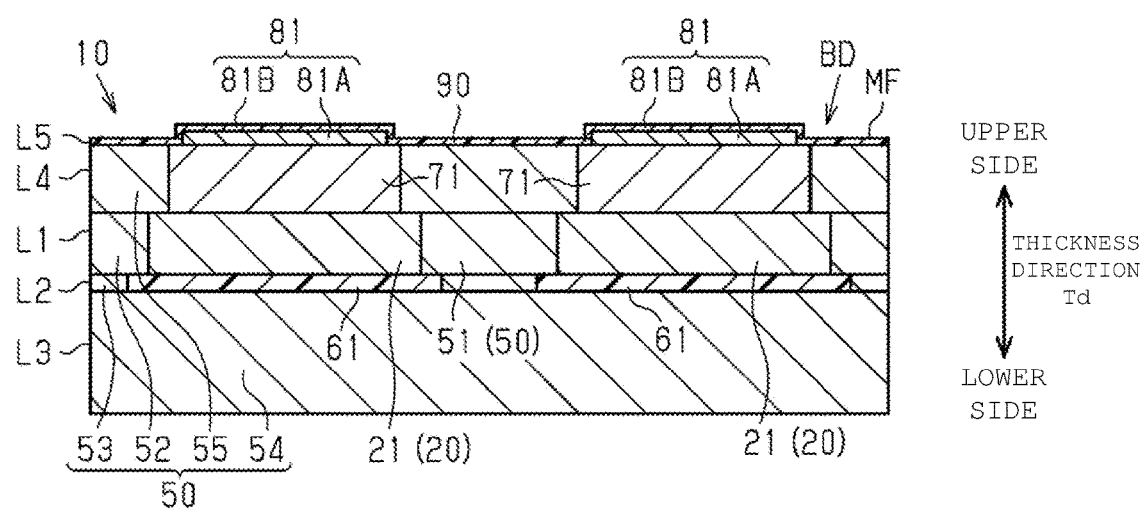
FIG. 6 is a sectional view of the inductor component taken along line 5-5 in FIG. 2.

As shown in FIG. 6, the first external terminal 81 has a first conducting portion 81A and a first insulating portion 81B. The first conducting portion 81A is directly connected to the top surface of the first vertical wire 71 with no other layer interposed therebetween. The material of the first conducting portion 81A contains a metal, and is copper in the present embodiment.

On the first conducting portion 81A, the first insulating portion 81B is stacked. In the present embodiment, in the surface of the first conducting portion 81A, the surface other than the surface in contact with the first vertical wire 71 and the surface in contact with the insulating layer 90 is covered with the first insulating portion 81B. That is, the first insulating portion 81B covers the first conducting portion 81A. The material of the first insulating portion 81B is a copper oxide. That is, the material of the first insulating portion 81B is a metal oxide of the metal material of the first conducting portion 81A. Therefore, the first insulating portion 81B has the insulating properties higher than those of the first conducting portion 81A. The dimension of the first insulating portion 81B in the thickness direction Td is 1.5 micrometers or less.

As described above, in the first external terminal 81, the first conducting portion 81A is covered with the first insulating portion 81B, and thus insulated from the outside of the element body BD. It should be noted that in the present embodiment, as shown in FIG. 1, the second external terminal 82 has a second conducting portion 82A and a second insulating portion 82B. Since the second conducting portion 82A and the second insulating portion 82B are similar to the first conducting portion 81A and the first insulating portion 81B, the detailed description is omitted.

In the inductor component 10, the DC electrical resistance of the parts from the first conducting portion 81A of the first external terminal 81 to the second conducting portion 82A of the second external terminal 82 with the first vertical wire 71, the inductor wire 20, and the second vertical wire 72 interposed therebetween can be measured by a four-terminal method. The total value of the DC electrical resistance of the first insulating portion 81B of the first external terminal 81 and the DC electrical resistance of the second insulating portion 82B of the second external terminal 82 is larger than the DC electrical resistance of the parts above.

More specifically, in the present embodiment, the DC electrical resistance of the parts from the first conducting portion 81A of the first external terminal 81 to the second conducting portion 82A of the second external terminal 82 with the first vertical wire 71, the inductor wire 20, and the second vertical wire 72 interposed therebetween is 1 mΩ or more and 50 mΩ or less (i.e., from 1 mΩ to 50 mΩ). The inductance value obtained in the case in which an electric current is flowed through these parts is 1 nH or more and 10 nH or less (i.e., from 1 nH to 10 nH).

It should be noted that the inductance value is measured in which the S parameter is measured by shunt through measurement at a frequency of 140 MHz using network analyzer E5071 manufactured by Keysight Technologies or a corresponding model and the value is converted into an inductance value However, the influence of the jigs and tools is removed by De-Embedding and short circuit correction.

Next, a manufacturing method for an inductor component 10 according to the first embodiment will be described.

Figure 7:
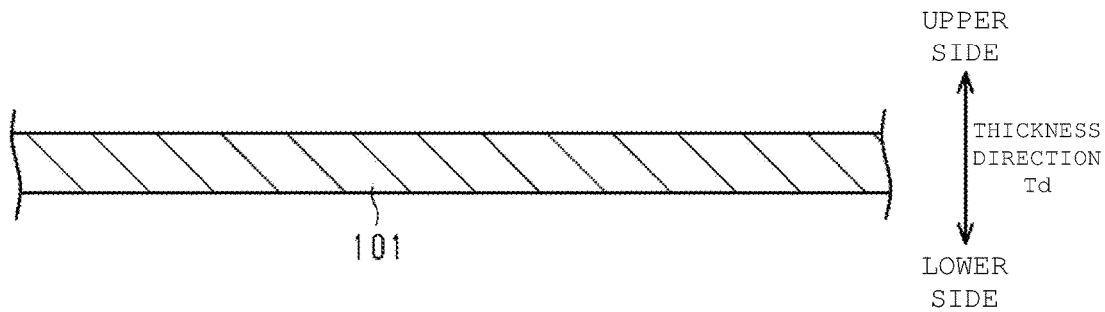
FIG. 7 is an illustration of a manufacturing method for an inductor component according to the first embodiment.

As shown in FIG. 7, first, a base member preparing step is performed. Specifically, a base member 101 in a plate shape is prepared. The base member 101 is made of ceramics. The base member 101 is in a rectangular shape when viewed from the thickness direction Td. The dimensions of edges are dimensions in which a plurality of the inductor components 10 is housed. In the following description, the description will be made as the direction orthogonal to the surface direction of the base member 101 is the thickness direction Td.

Figure 8:
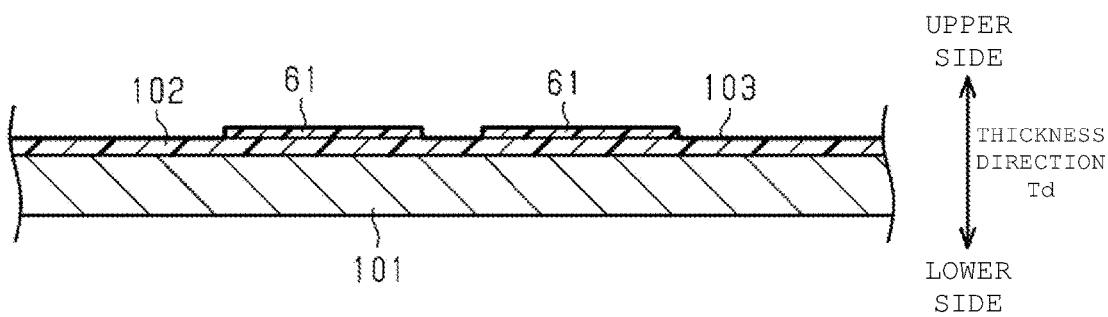
FIG. 8 is an explanatory diagram of the manufacturing method for an inductor component according to the first embodiment.

Subsequently, as shown in FIG. 8, a dummy insulating layer 102 is applied throughout the top surface of the base member 101. Subsequently, when viewed from the thickness direction Td, the insulating resin 61 is patterned by photolithography in a range slightly wider than the range in which the inductor wire 20 is disposed.

Subsequently, a seed layer forming step of forming a seed layer 103 is performed. Specifically, the seed layer 103 made of copper is formed on the top surfaces of the insulating resin 61 and the dummy insulating layer 102 by sputtering from the top surface of the base member 101 side. It should be noted that in the drawings, the seed layer 103 is depicted by thick lines.

Figure 9:
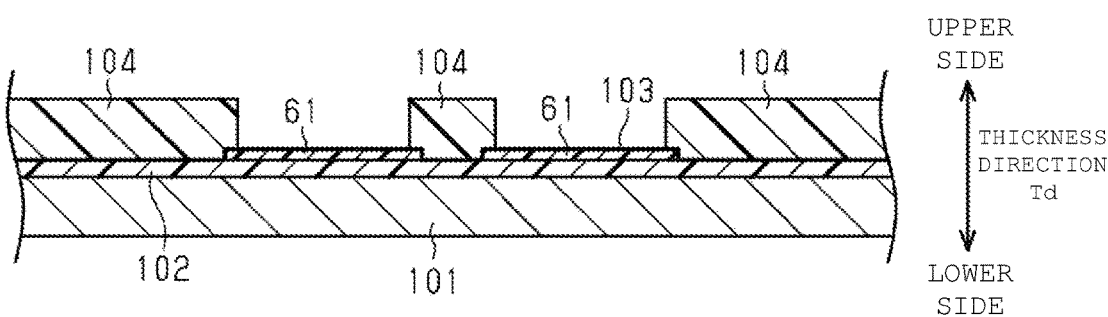
FIG. 9 is an explanatory diagram of the manufacturing method for an inductor component according to the first embodiment.

Subsequently, as shown in FIG. 9, a first covering step of forming a first covering part 104 that covers the parts on which the inductor wire 20, the first support wire 41, and the second support wire 42 are not formed in the top surface of the seed layer 103 is performed. Specifically, first, a photosensitive dry film resist is applied to throughout the top surface of the seed layer 103. Subsequently, in all the range of the top surface of the dummy insulating layer 102 and the top surface of the insulating resin 61, the top surface of the outer edge part in the range covered with the insulating resin 61 is cured by exposure. After that, in the applied dry film resist, the parts that are not cured are removed using a chemical solution. Thus, in the applied dry film resist, the cured parts are formed as the first covering part 104. On the other hand, from the parts of the applied dry film resist, which are removed using the chemical solution without forming the cover of the first covering part 104, the seed layer 103 is exposed. The thickness of the first covering part 104, which is the dimension of the first covering part 104 in the thickness direction Td is slightly larger than the thickness of the inductor wire 20 of the inductor component 10 in FIG. 3. It should be noted that photolithography in other steps, described later, are also similar steps, and the detailed description is omitted.

Figure 10:
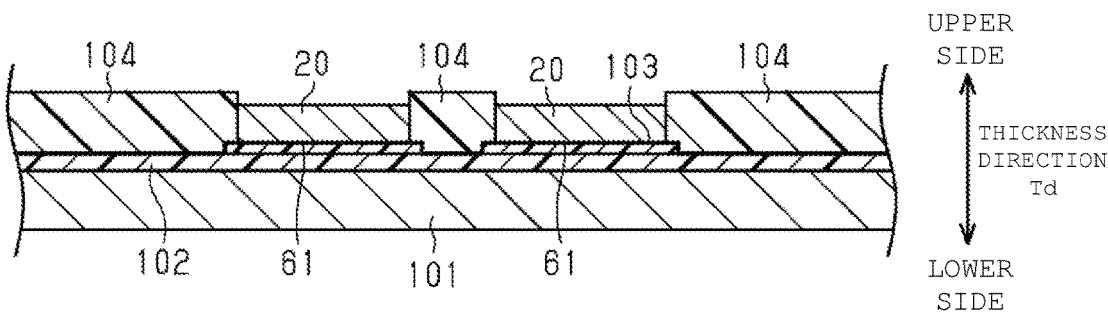
FIG. 10 is an explanatory diagram of the manufacturing method for an inductor component according to the first embodiment.

Subsequently, as shown in FIG. 10, a wire forming step of forming the inductor wire 20, the first support wire 41, and the second support wire 42, by electroplating on the parts of the top surface of the insulating resin 61, which are not covered with the first covering part 104 is performed.

Specifically, on the top surface of the insulating resin 61, copper is grown from the parts from which the seed layer 103 is exposed using electrolytic copper plating. Thus, the inductor wire 20, the first support wire 41, and the second support wire 42 are formed. Therefore, in this embodiment, the step of forming the plurality of inductor wires 20 and the step of forming the plurality of first support wires 41 and the plurality of second support wires 42 that connect pads of different inductor wires 20 to each other are the same step. The inductor wire 20, the first support wire 41, and the second support wire 42 are formed on the same plane. It should be noted that FIG. 10, the inductor wire 20 is depicted, and the support wires are not depicted.

Figure 11:
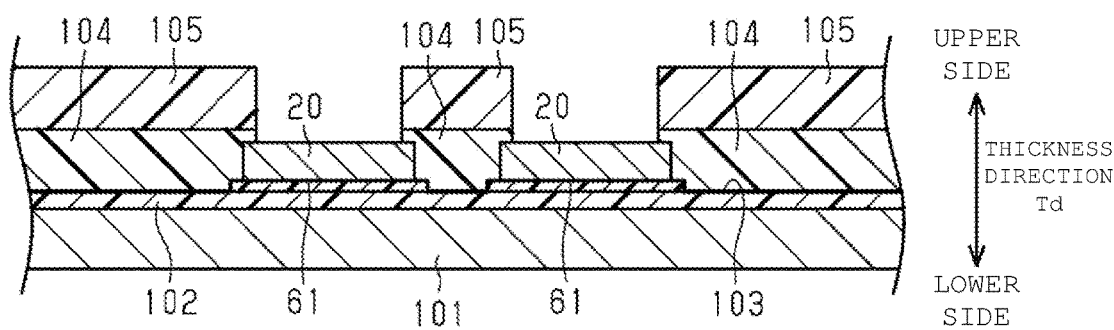
FIG. 11 is an explanatory diagram of the manufacturing method for an inductor component according to the first embodiment.

Subsequently, as shown in FIG. 11, a second covering step of forming a second covering part 105 is performed. The range in which the second covering part 105 is formed is the range in which the first vertical wire 71 and the second vertical wire 72 are not formed on all the top surface of the first covering part 104, the ranges of all the top surfaces of the support wires, and the range of the top surface of the inductor wire 20. In this range, the second covering part 105 is formed by photolithography the same as the method of forming the first covering part 104. The dimension of the second covering part 105 in the thickness direction Td is the same as the dimension of the first covering part 104.

Subsequently, a vertical wire forming step of forming the vertical wires is performed. Specifically, on the inductor wire 20, the first vertical wire 71 and the second vertical wire 72 are formed by electrolytic copper plating on the parts that are not covered with the second covering part 105. Thus, the first vertical wire 71 and the second vertical wire 72 is formed in the thickness direction Td vertical to the plane on which the inductor wires 20, the first support wires 41, and the second support wires 42 are formed. In the vertical wire forming step, the setting is made such that the top end of growing copper is located slightly lower from the top surface of the second covering part 105. Specifically, the setting is made such that the dimensions of the vertical wires in the thickness direction Td before cut, described later, are the same as the dimensions of the inductor wires in the thickness direction Td.

Figure 12:
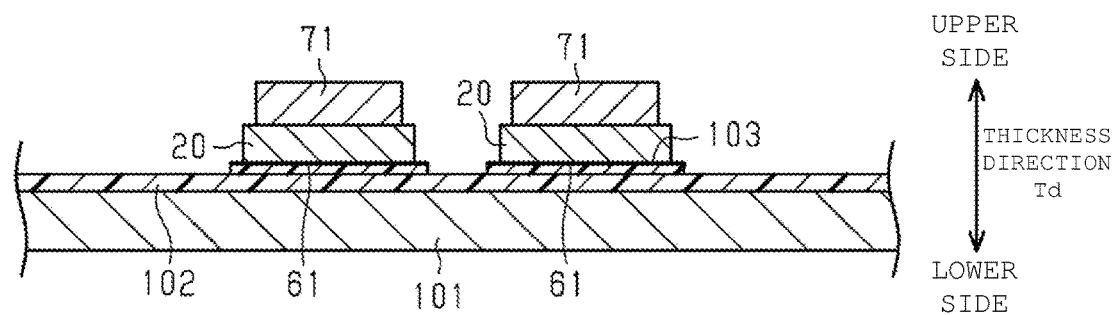
FIG. 12 is an explanatory diagram of the manufacturing method for an inductor component according to the first embodiment.

Subsequently, as shown in FIG. 12, a covering part removing step of removing the first covering part 104 and the second covering part 105 is performed. Specifically, the first covering part 104 and the second covering part 105 are wet-etched with a chemical, and the first covering part 104 and the second covering part 105 are peeled. It should be noted that in FIG. 12, the first vertical wires 71 are depicted, and the second vertical wires 72 are not depicted.

Subsequently, a seed layer etching step of etching the seed layer 103 is performed. The seed layer 103 is etched, and the exposed seed layer 103 is removed. As described above, the inductor wires and the support wires are formed by semi-additive process (SAP).

Figure 13:
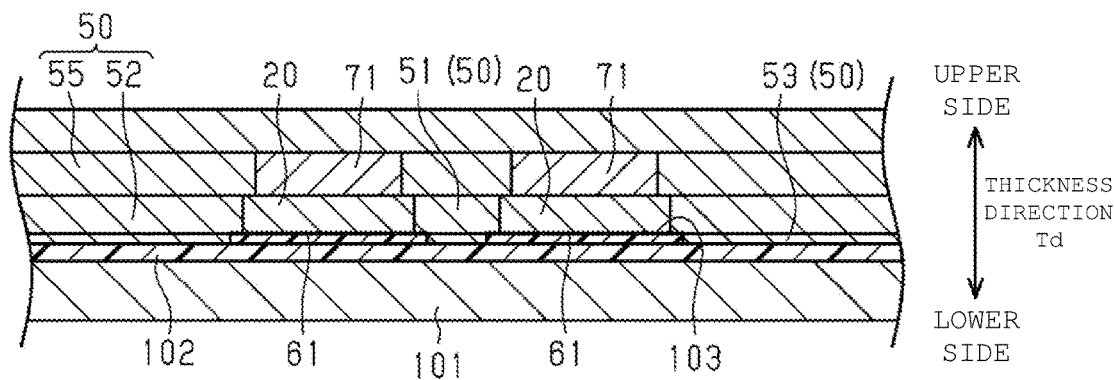
FIG. 13 is an explanatory diagram of the manufacturing method for an inductor component according to the first embodiment.

Subsequently, as shown in FIG. 13, a second magnetic layer forming step of stacking the inner magnetic path 51, the outer magnetic path 52, the insulating resin magnetic layer 53, and the second magnetic layer 55 is performed. Specifically, first, a resin containing magnetic powder that is the material of the magnetic layer 50 is applied to the top surface of the base member 101 side. At this time, the resin containing the magnetic powder is applied such that the top surfaces of the vertical wires are also covered. Subsequently, the resin containing the magnetic powder is compressed by press working, and the inner magnetic path 51, the outer magnetic path 52, the insulating resin magnetic layer 53, and the second magnetic layer 55 are formed on the top surface of the base member 101 side.

Figure 14:
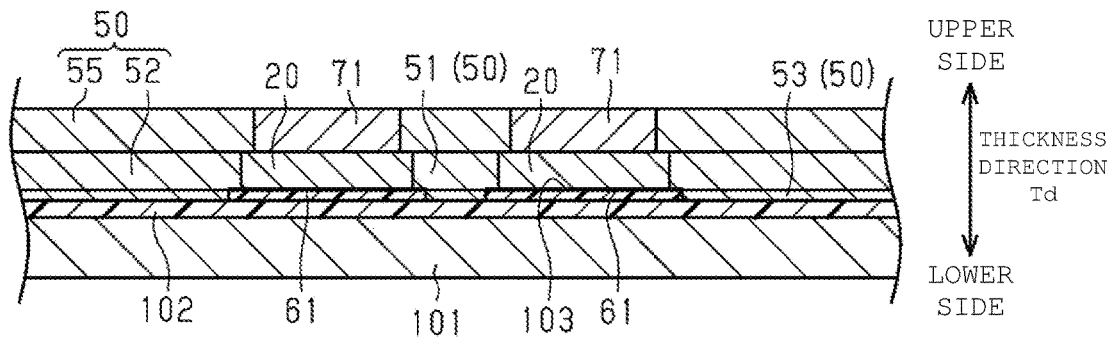
FIG. 14 is an explanatory diagram of the manufacturing method for an inductor component according to the first embodiment.

Subsequently, as shown in FIG. 14, the upper part of the second magnetic layer 55 is cut until the top surfaces of the vertical wires is exposed. It should be noted that although the inner magnetic path 51, the outer magnetic path 52, the insulating resin magnetic layer 53, and the second magnetic layer 55 are integrally formed, in the drawings, the inner magnetic path 51, the outer magnetic path 52, the insulating resin magnetic layer 53, and the second magnetic layer 55 are separately depicted.

Figure 15:
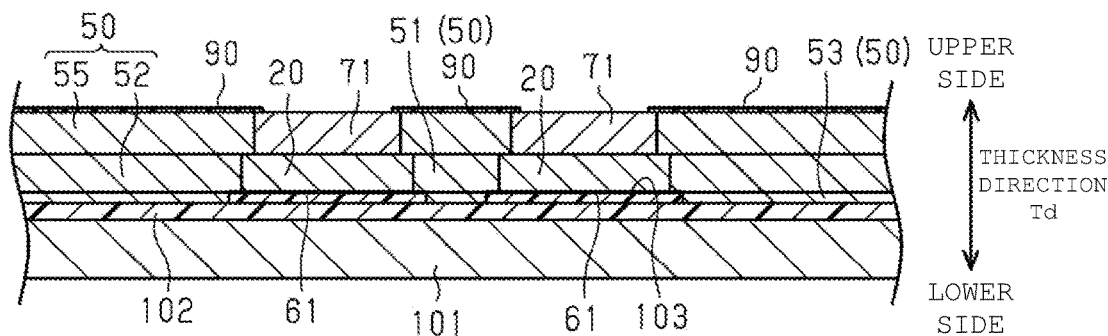
FIG. 15 is an explanatory diagram of the manufacturing method for an inductor component according to the first embodiment.

Subsequently, as shown in FIG. 15, an insulating layer forming step is performed. Specifically, on the parts on which no external terminal is formed on the top surface of the second magnetic layer 55 and the top surfaces of the vertical wires, a solder resist that functions as the insulating layer 90 is patterned by photolithography. It should be noted that in the present embodiment, the direction orthogonal to the top surface of the insulating layer 90, i.e., the principal surface MF of the element body BD is the thickness direction Td.

Figure 16:
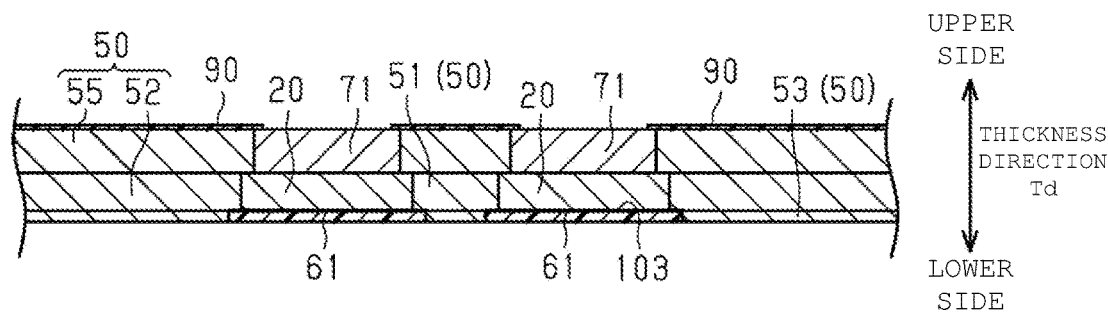
FIG. 16 is an explanatory diagram of the manufacturing method for an inductor component according to the first embodiment.

Subsequently, as shown in FIG. 16, a base member cutting step is performed. Specifically, the base member 101 and the dummy insulating layer 102 are all removed by cutting. It should be noted that as the result of cutting all the dummy insulating layer 102, although the lower parts of the insulating resins are locally cut, the inductor wires are not removed.

Figure 17:
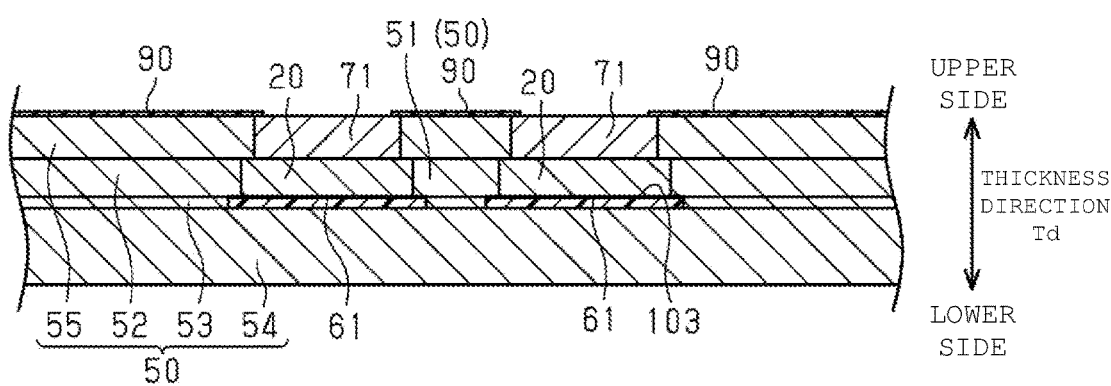
FIG. 17 is an explanatory diagram of the manufacturing method for an inductor component according to the first embodiment.

Subsequently, as shown in FIG. 17, a first magnetic layer forming step of stacking the first magnetic layer 54 is performed. Specifically, first, a resin containing magnetic powder that is the material of the first magnetic layer 54 is applied to the under surface of the base member 101. Subsequently, the resin containing the magnetic powder is compressed by press working, and the first magnetic layer 54 is formed on the under surface of the base member 101.

Subsequently, the lower end portion of the first magnetic layer 54 is cut. For example, the lower end portion of the first magnetic layer 54 is cut such that the dimensions from the top surfaces of the external terminals to the under surface of the first magnetic layer 54 have desired values.

Figure 18:
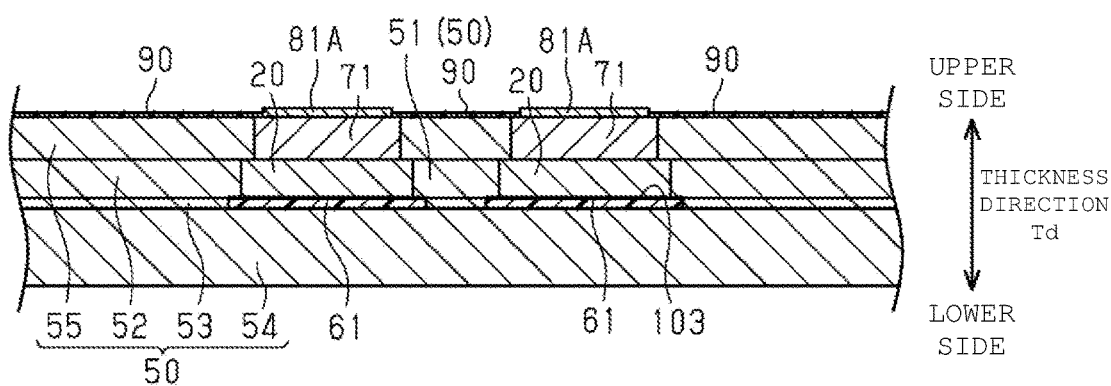
FIG. 18 is an explanatory diagram of the manufacturing method for an inductor component according to the first embodiment.

Subsequently, as shown in FIG. 18, a terminal portion forming step is performed. Specifically, on the top surface of the second magnetic layer 55 and the top surfaces of the vertical wires, the first conducting portion 81A and the second conducting portion 82A are formed on the parts that are not covered with the insulating layer 90. The first conducting portion 81A and the second conducting portion 82A are formed by electroless plating of copper. Thus, the first conducting portion 81A and the second conducting portion 82A in copper layers are formed. In FIG. 18, the first conducting portion 81A is depicted, and the second conducting portion 82A is not depicted.

Figure 19:
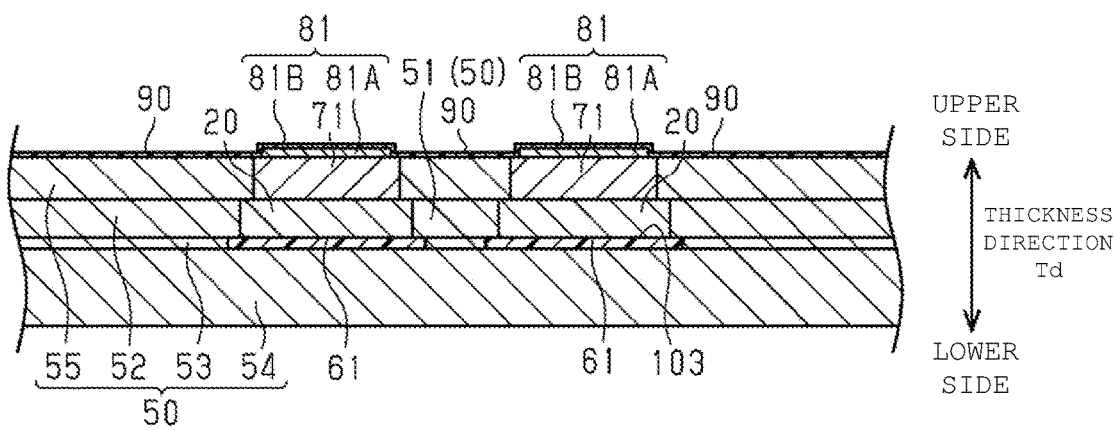
FIG. 19 is an explanatory diagram of the manufacturing method for an inductor component according to the first embodiment.

Subsequently, as shown in FIG. 19, the first insulating portion 81B and the second insulating portion 82B are formed. Specifically, the surfaces of the first conducting portion 81A and the second conducting portion 82A are oxidized by heat treatment at a high temperature. Thus, parts including the surfaces of the first conducting portion 81A and the second conducting portion 82A are oxidized, and the first insulating portion 81B and the second insulating portion 82B made of copper oxidize are formed. It should be noted that in FIG. 19, the first insulating portion 81B is depicted, and the second insulating portion 82B is not depicted.

Figure 20:
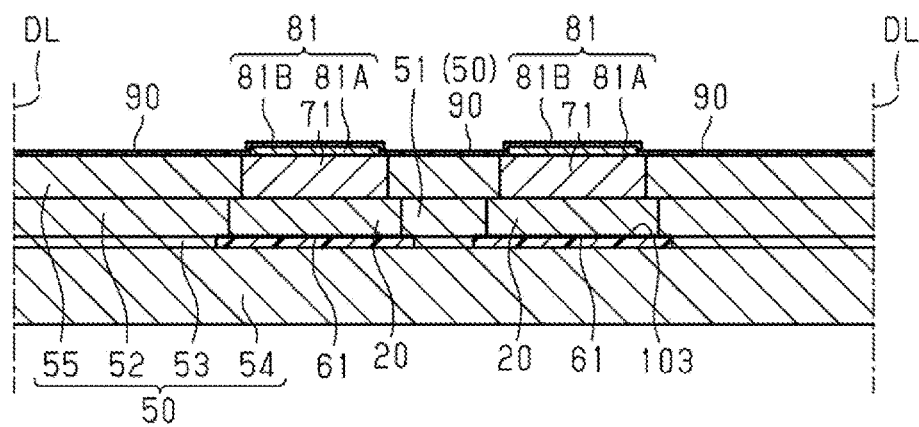
FIG. 20 is an explanatory diagram of the manufacturing method for an inductor component according to the first embodiment.

Subsequently, as shown in FIG. 20, a dicing step is performed. Specifically, die separation is performed by cutting with a dicing machine at break lines DL. As a result, the inductor component 10 can be obtained.

Figure 21:
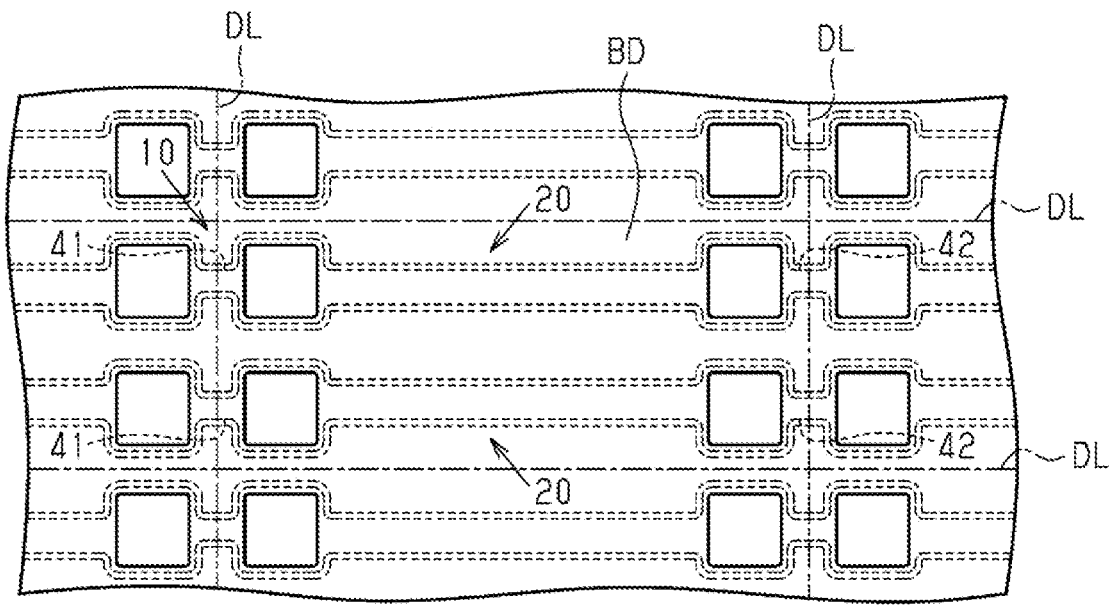
FIG. 21 is an explanatory diagram of the manufacturing method for an inductor component according to the first embodiment.

It should be noted that in the state before cutting with a dicing machine, as shown in FIG. 21, for example, the plurality of the inductor components is arranged side by side in the long-side direction Ld and in the short-side direction Wd, and the individual inductor components are connected to each other in a form of the element body BD through the first support wires 41 and the second support wires 42. The first support wires 41 and the second support wires 42 included on the break lines DL are cut in the thickness direction Td, and the section of the first support wire 41 is exposed as the exposed surface 41A from the first side surface 93. The section of the second support wire 42 is exposed as the exposed surface 42A to the second side surface 94. It should be noted that in FIG. 21, the fifth layer L5 is omitted.

It should be noted that after the dicing step, the inductor components 10 are stood for a certain period under the presence of oxygen. Thus, the parts including the exposed surface 41A of the first support wire 41 and the parts including the exposed surface 42A of the second support wire 42 are oxidized to form Cu oxides.

As described above, in the dicing step, the first support wires 41 and the second support wires 42 included on the break lines DL are cut. In cutting the first support wire 41 and the second support wire 42, shearing stress is applied to the first support wire 41 and the second support wire 42. The support wires are deformed by the stress. Therefore, as shown in FIG. 5, the section on the first side surface 93 of the first support wire 41, i.e., the exposed surface 41A has a distorted shape. Similarly, the section of the second support wire 42 on the second side surface 94, i.e., the exposed surface 42A has a distorted shape.

Next, the operation of the first embodiment will be described.

The inductor component 10 is built in a circuit board 150 for use, for example. A method of incorporating the inductor component 10 in the circuit board 150 will be described.

Figure 22:
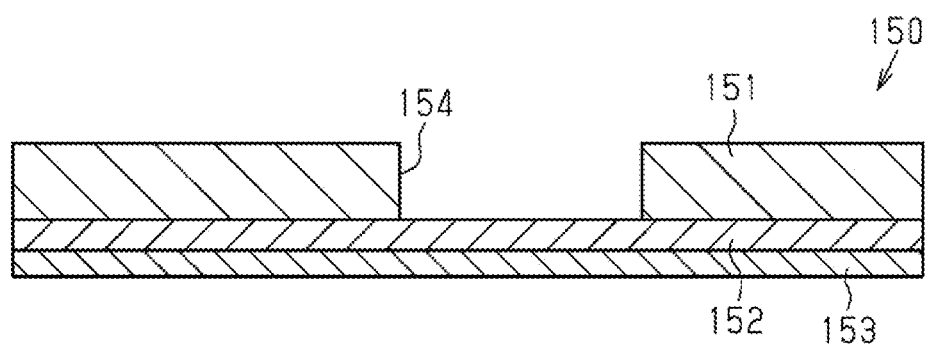
FIG. 22 is an explanatory diagram of a substrate mounting method for the inductor component according to the first embodiment.

As shown in FIG. 22, a core material 151 is prepared. The core material 151 is in a plate shape, and is larger than the inductor component 10 in both the long-side direction Ld and the short-side direction Wd. It should be noted that on one surface of the core material 151, a first substrate insulating layer 152 is stacked. On the first substrate insulating layer 152, first copper foil 153 is stacked. Subsequently, in the core material 151, a housing hole 154 that penetrates through the core material 151 is formed by laser machining at a site at which the inductor component 10 is installed.

Figure 23:
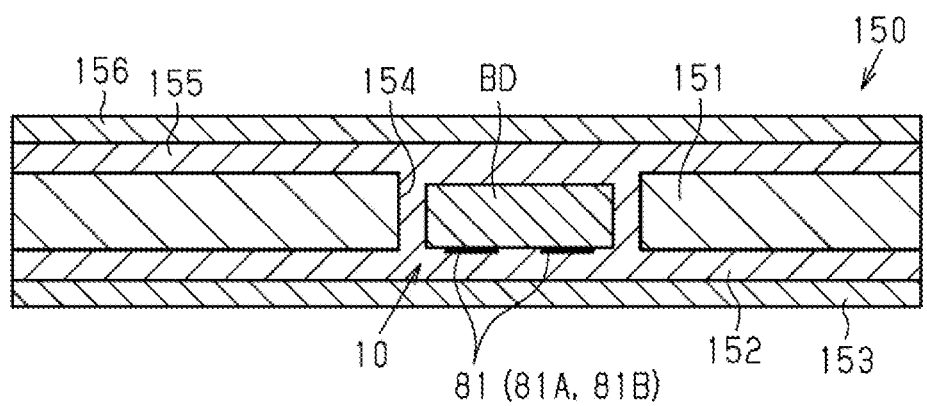
FIG. 23 is an explanatory diagram of the substrate mounting method for the inductor component according to the first embodiment.

Subsequently, as shown in FIG. 23, the inductor component 10 is housed in the housing hole 154. The inductor component 10 is housed such that the principal surface MF of the inductor component 10 is directed to the bottom side of the housing hole 154. An insulating resin is poured so as to fill the hole housing the inductor component 10, and a second substrate insulating layer 155 is formed by press working. To the upper side of the second substrate insulating layer 155, second copper foil 156 is pressure-bonded.

Figure 24:
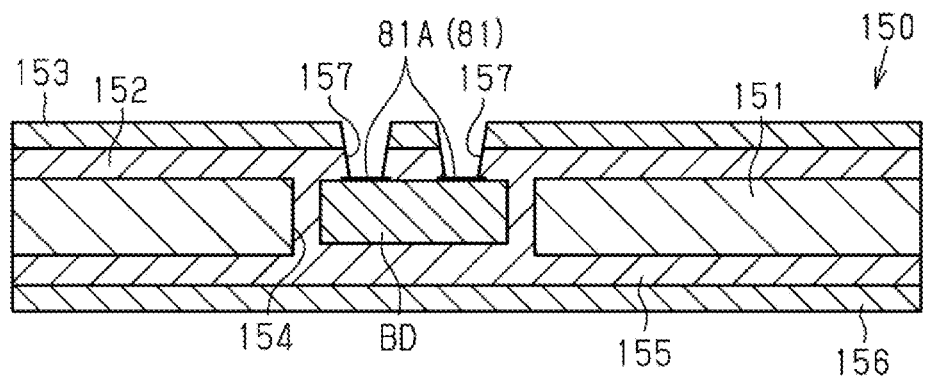
FIG. 24 is an explanatory diagram of the substrate mounting method for the inductor component according to the first embodiment.

Subsequently, as shown in FIG. 24, a connection hole 157 is formed by laser machining from the first copper foil 153 side such that the first conducting portion 81A of the first external terminal 81 and the second conducting portion 82A of the second external terminal 82 are exposed. Subsequently, the inner surface of the connection hole 157 is acid-washed. With these laser machining and acid cleaning, the first insulating portion 81B and the second insulating portion 82B made of copper oxide are removed.

Figure 25:
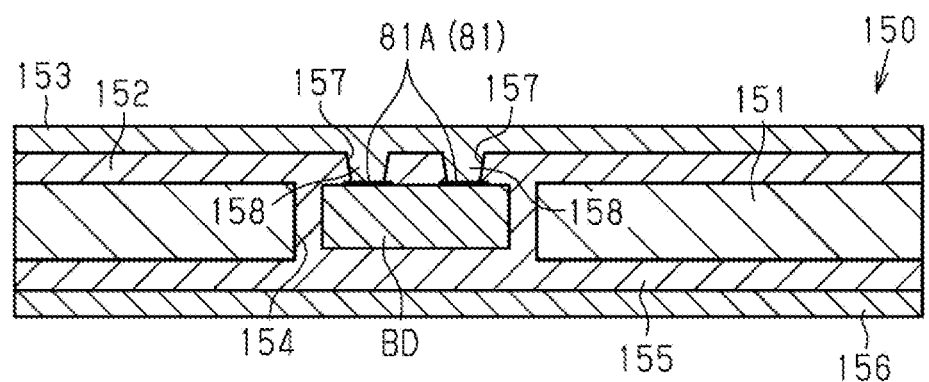
FIG. 25 is an explanatory diagram of the substrate mounting method for the inductor component according to the first embodiment.

Subsequently, as shown in FIG. 25, copper filling plating is performed so as to fill the connection hole 157. Thus, the connection hole 157 is filled with a via 158 made of copper, and the first conducting portion 81A of the first external terminal 81 and the second conducting portion 82A of the second external terminal 82 are electrically connected to the second copper foil 156 with the via 158 interposed therebetween.

Figure 26:
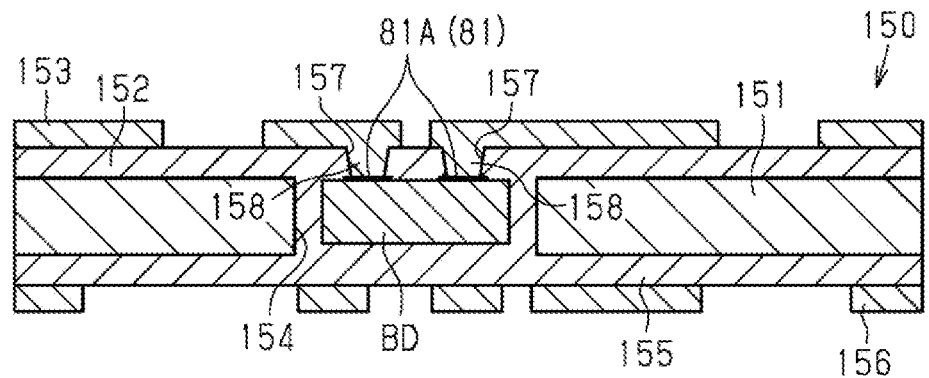
FIG. 26 is an explanatory diagram of the substrate mounting method for the inductor component according to the first embodiment.

As shown in FIG. 26, the first copper foil 153 and the second copper foil 156 are patterned to for wires. As a result, the inductor component 10 is built in the circuit board 150.

Next, the effects of the first embodiment will be described.

It should be noted that the effect similar to the effect of the external terminal will be described on the first external terminal 81, and the description of the second external terminal 82 is omitted.

(1-1) According to the first embodiment, the first conducting portion 81A of the first external terminal 81 of the inductor component 10 is insulated from the outside of the element body BD by the first insulating portion 81B. Therefore, supposing that the first external terminal 81 of the inductor component 10 is brought into contact with another component or element at the time of storage before the inductor component 10 is installed on the circuit board 150, it is possible to prevent the electric current from being flowed through the first conducting portion 81A.

(1-2) According to the first embodiment, the first insulating portion 81B is made of copper oxide. Therefore, the first insulating portion 81B can be formed by oxidizing the metal layer formed by plating. That is, a special process for forming the first insulating portion 81B is unnecessary.

(1-3) According to the first embodiment, the dimension of the first insulating portion 81B in the thickness direction Td is 1.5 micrometers or less. That is, the dimension of the first insulating portion 81B in the thickness direction Td is correspondingly small. Therefore, the influence of the first insulating portion 81B that is affected on the dimension in the thickness direction Td of the overall inductor component 10 can be suppressed. In mounting the inductor component 10 on the circuit board 150, the first insulating portion 81B is easily removed. In general, since the surface of the first external terminal 81 is cut by approximately two to five micrometers by laser machining and acid cleaning, as long as the dimension of the first insulating portion 81B in the thickness direction Td is 1.5 micrometers or less, the first insulating portion 81B of the first external terminal 81 is easily removed with no additional processing.

(1-4) According to the first embodiment, the material of the first insulating portion 81B is a copper oxide. Since copper is relatively easily oxidized, the formation of the first insulating portion 81B can be realized at relatively low cost.

(1-5) According to the first embodiment, two inductor wires 20 are provided. Therefore, as compared with the case in which one inductor wire 20 is provided in one component, it is possible to suppress an increase in the area necessary for mounting the inductor component 10 on the circuit board 150 or the like.

(1-6) In the first embodiment, the inductor wire 20 is provided solely in the first layer L1 in the element body BD. The vertical wires are directly in contact with the inductor wire 20. Therefore, it is easy to reduce the thickness of the element body BD in the thickness direction Td. In particular, the two inductor wires 20 are disposed on the same plane. Therefore, it is possible to contribute to a reduction in the thickness of the inductor component 10 in the thickness direction Td rather than disposing the two inductor wires 20 in different layers. As the number of the first inductor wires 20R and the second inductor wires 20L to be stacked is smaller, the influence due to the positions of the first wire main body 21R and the second wire main body 21L and the positions of the first support wire 41 and the second support wire 42 is larger, and thus the configuration of the present application is much more effective.

(1-7) In the first embodiment, the inductor wire 20, the first support wire 41, and the second support wire 42 are present in the first layer L1. In the state in which the plurality of inductor components 10 is arranged side by side, i.e., in the state before cutting with a dicing machine, a configuration can be adopted in which the plurality of inductor wires is connected using the first support wire 41 and the second support wire 42. When the plurality of inductor wires 20 are connected using the first support wire 41 and the second support wire 42, these inductor wires 20 can be supported and positioned with no necessity of a substrate or the like for supporting the inductor wire 20. Therefore, it is possible to contribute to a reduction in the thickness of the inductor component 10 in that a substrate or the like for supporting the inductor wire 20 is unnecessary.

(1-8) It is assumed that the center axis A1 of the first support wire 41 is matched with the center axis C1 of the wire main body 21, and the center axis A2 of the second support wire 42 is matched with the center axis C1 of the wire main body 21. In this state, when a torsion force is applied to the inductor component 10, the inductor wire 20, the first support wire 41, and the second support wire 42 can function as a center axis of torsion, and thus, it is difficult for the overall element body BD to resist the torsion force.

On the other hand, in the first embodiment, the center axis A1 of the first support wire 41 is not matched with the center axis C1 of the wire main body 21, and the center axis A2 of the second support wire 42 is not matched with the center axis C1 of the wire main body 21. Therefore, the inductor wire 20, the first support wire 41, and the second support wire 42 as a whole do not function as the center axis of torsion, and the strength against the torsion force can be improved.

(1-9) According to the first embodiment, the total value of the DC electrical resistance of the first insulating portion 81B of the first external terminal 81 and the DC electrical resistance of the second insulating portion 82B of the second external terminal 82 is larger than the DC electrical resistance of the conducting portion including the inductor wire 20. Therefore, insulation from the outside of the element body BD can be more reliably ensured.

(1-10) According to the first embodiment, the DC electrical resistance of the parts from the first conducting portion 81A of the first external terminal 81 to the second conducting portion 82A of the second external terminal 82 with the first vertical wire 71, the inductor wire 20, and the second vertical wire 72 interposed therebetween is 1 mΩ or more and 50 mΩ or less (i.e., from 1 mΩ to 50 mΩ). The inductance value obtained in the case in which an electric current is flowed through these parts is 1 nH or more and 10 nH or less (i.e., from 1 nH to 10 nH). Therefore, for example, the inductor component 10 is suitable for use in a DC/DC converter that performs a high-frequency switching operation.

(1-11) According to the first embodiment, the material of the part including the exposed surface 41A of the first support wire 41 and the material of the part including the exposed surface 42A of the second support wire 42 are Cu oxide. Therefore, supposing that the first support wire 41 and the second support wire 42 come into contact with other components or the like, the electric current can be prevented from being flowed through the inductor wire 20.

(1-12) In the first embodiment, the first magnetic layer 54 and the second magnetic layer 55 are resin composites containing metal magnetic powder. The metal magnetic powder is an alloy containing iron, and the mean particle size of the metal magnetic powder is approximately five micrometers. With the use of the magnetic powder having a small particle size of 10 micrometers or less in this manner, it is possible to reduce the iron loss while ensuring the relative permeability of the first magnetic layer 54 and the second magnetic layer 55.

(1-13) In the first embodiment, the pitch in the short-side direction Wd from the center axis C1 of the wire main body 21 of the first inductor wire 20R to the center axis C1 of the wire main body 21 of the second inductor wire 20L is approximately 250 micrometers. This is twice or more the minimum distance of the distance from the first support wire 41 to the end of the first side surface 91 in the short-side direction Wd and the distance from the second support wire 42 to the end of the second side surface 92 in the short-side direction Wd. Thus, since the pitch is relatively large and the space between the wire main bodies 21 having a relatively high magnetic flux density can be made large, the acquisition efficiency of the inductance value can be improved.

In the first embodiment, the gap between the first pads 22 and the gap between the second pads 23, which are the minimum gaps between the inductor wires 20 adjacent to each other, are approximately 50 micrometers or more. This is suitable for ensuring insulation between the inductor wires 20. It is further preferable when the gap is approximately 100 micrometers or more.

Second Embodiment

In the following, a second embodiment of the inductor component will be described. It should be noted that the drawings sometimes show components in scaling up for easy understanding. The dimensions and ratios of the components sometimes different from those in other drawing. The description of configurations similar to those of the first embodiment is sometimes simplified or omitted.

Figure 27:
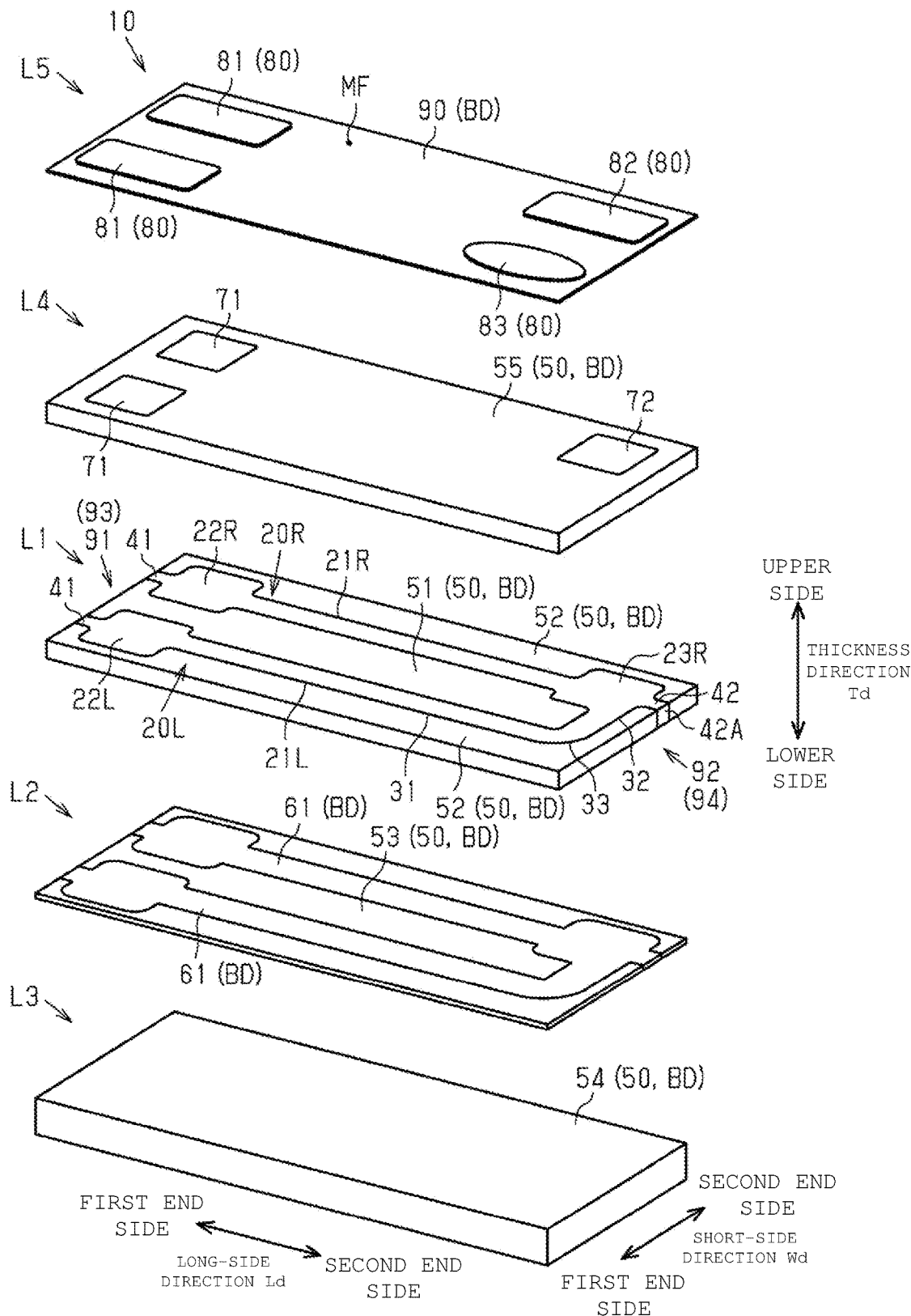
FIG. 27 is an exploded perspective view of an inductor component according to a second embodiment.

As shown in FIG. 27, the inductor component 10 has a structure such that five layers are stacked in the thickness direction Td as a whole. It should be noted that in the following description, one side in the thickness direction Td is defined as the upper side and the opposite side of the one side is defined as the lower side.

A first layer L1 is composed of a first inductor wire 20R, a second inductor wire 20L, a first support wire 41, a second support wire 42, an inner magnetic path 51, and an outer magnetic path 52.

The first layer L1 is in a rectangular shape when viewed from the thickness direction Td. It should be noted that a direction in parallel with the long side of the rectangle is a long-side direction Ld, and a direction in parallel with the short side is a short-side direction Wd.

The first inductor wire 20R is formed of a first wire main body 21R, a first pad 22R provided at the first end of the first wire main body 21R, and a second pad 23R provided at the second end of the first wire main body 21R. The first wire main body 21R extends linearly in the long-side direction Ld of the first layer L1. In the first wire main body 21R, the first pad 22R is connected to the first end on the first end side in the long-side direction Ld. It should be noted that the first end on the first end side in the long-side direction Ld in the wire main body 21 may be enlarged such that the first end is more widened than is the center part of the wire main body 21 in the long-side direction Ld.

The dimension of the first pad 22R in the short-side direction Wd is larger than the dimension of the first wire main body 21R in the short-side direction Wd. The first pad 22R is in a nearly square shape when viewed from the thickness direction Td.

In the first wire main body 21R, the second pad 23R is connected to the second end on the second end side in the long-side direction Ld. It should be noted that the second end on the second end side in the long-side direction Ld in the wire main body 21 may be enlarged such that the second end is more widened than is the center part of the wire main body 21 in the long-side direction Ld.

The dimension of the second pad 23R in the short-side direction Wd is larger than the dimension of the first wire main body 21R in the short-side direction Wd. The second pad 23R is in a nearly square shape the same as the first pad 22R when viewed from the thickness direction Td. It should be noted that the first inductor wire 20R is disposed close to the first layer L1 on the second end side in the short-side direction Wd.

The second inductor wire 20L is formed of a second wire main body 21L, a first pad 22L provided at the second end of the second wire main body 21L, and a second pad 23R provided at the second end of the second wire main body 21L.

The second wire main body 21L has two linear portions and a part connecting the two linear portions, and extends in an L shape as a whole. Specifically, the second wire main body 21L is composed of a long linear portion 31 extending in the long-side direction Ld, a short linear portion 32 extending in the short-side direction Wd, and a connection portion 33 connecting these parts to each other.

Figure 28:
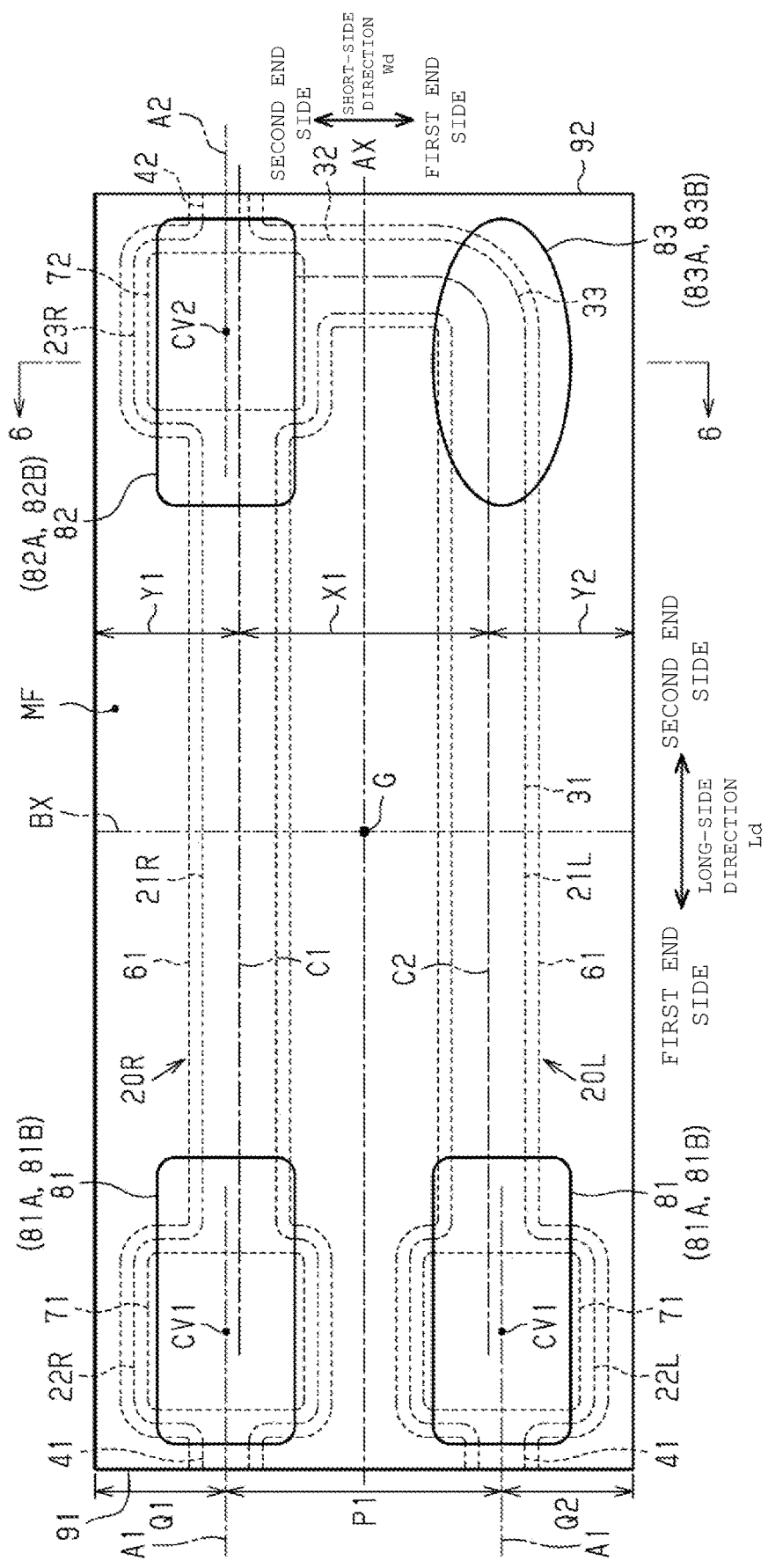
FIG. 28 is a transparent top view of the inductor component according to the second embodiment.

As shown in FIG. 28, supposing that a straight line passing the center of the first layer L1 in the short-side direction Wd and extending in the long-side direction Ld is a symmetry axis AX, the long linear portion 31 is disposed at a position in line symmetry to the first wire main body 21R relative to the symmetry axis AX. The length of the long linear portion 31 extending in the long-side direction Ld is slightly longer than the length of the first wire main body 21R extending in the long-side direction Ld. The dimension of the long linear portion 31 in the short-side direction Wd is equal to the dimension of the first wire main body 21R in the short-side direction Wd. The end of the long linear portion 31 on the first end side in the long-side direction Ld is connected to the first pad 22R. The end of the long linear portion 31 on the second end side in the long-side direction Ld is connected to the first end of the connection portion 33.

The second end of the connection portion 33 that is not connected to the long linear portion 31 is directed to the second end side in the short-side direction Wd. That is, the second wire main body 21L, the connection portion 33 is curved at an angle of 90 degrees from the first end side in the long-side direction Ld toward the second end side in the short-side direction Wd.

The second end of the connection portion 33 directed to on the second end side in the short-side direction Wd is connected to the first end of the short linear portion 32. It should be noted that the second end of the short linear portion 32 on the second end side in the short-side direction Wd may be enlarged such that the second end is more widened than the center part of the short linear portion 32 in the short-side direction Wd.

The dimension of the short linear portion 32 in the long-side direction Ld is equal to the dimension of the long linear portion 31 in the short-side direction Wd. The second end of the short linear portion 32 directed to the second end side in the short-side direction Wd is connected to the second pad 23R that is connected to the first wire main body 21R. That is, the second pad 23R of the first inductor wire 20R is the same pad as the second pad 23R of the second inductor wire 20L.

The number of turns of the second inductor wire 20L is determined based on a virtual vector. The starting point of the virtual vector is disposed on the center axis C2 extending in the direction of extending the second wire main body 21L through the center of the wire width of the second wire main body 21L. In the virtual vector, the number of turns is determined as 1.0 turns at a 360 degree rotation of the orientation of the virtual vector when the starting point of the second wire main body 21L is moved from the first end to the second end of the center axis C2 from the state in which the starting point is disposed at the first end, when viewed from the thickness direction Td. However, in the case in which the direction of the virtual vector is wound a plurality of times, the number of turns is assumed to increase in the case in which the virtual vector is continuously wound in the same direction. In the case in which the virtual vector is wound in a direction different from the direction of the previous winding, the number of turns is counted again from zero turns. For example, in the case in which the virtual vector is wound clockwise at an angle of 180 and then wound counterclockwise at an angle of 180, the number of turns is 0.5 turns. Therefore, when the virtual vector is wound at an angle of 180, for example, the number of turns is 0.5 turns. In the present embodiment, the orientation of the virtual vector virtually disposed on the second wire main body 21L is rotated at an angle of 90 at the connection portion 33. Therefore, the number of turns at which the second wire main body 21L is wound is 0.25 turns. It should be noted that the center axis C2 of the second wire main body 21L is a line that follows the intermediate points of the second wire main body 21L in the direction orthogonal to the direction in which the second wire main body 21L extends. That is, the center axis C2 of the second wire main body 21L is in a nearly L shape when viewed from the thickness direction Td.

As shown in FIG. 28, to the end of the long linear portion 31 of the second wire main body 21L on the first end side in the long-side direction Ld, the first pad 22L is connected. The first pad 22L is in a shape the same as the shape of the first pad 22R connected to the first wire main body 21R. That is, the first pad 22L is in a nearly square shape when viewed from the thickness direction Td. The first pad 22L is disposed in line symmetry to the first pad 22R connected to the first wire main body 21R relative to the symmetry axis AX.

In the first layer L1, from the first pad 22R on the opposite side of the first wire main body 21R, the first support wire 41 extends. That is, the first support wire 41 extends from the edge of the first pad 22R on the first end side in the long-side direction Ld. The first support wire 41 linearly extends in parallel with the long-side direction Ld. The first support wire 41 extends to a first side surface 91 on the first end side in the long-side direction Ld of the first layer L1, and is exposed from the first side surface 91. Similarly, on the first layer L1, the first support wire 41 also extends from the first pad 22L on the opposite side of the second wire main body 21L.

In the first layer L1, from the second pad 23R on the opposite side of the first wire main body 21R, the second support wire 42 extends. That is, the second support wire 42 extends from the edge of the second pad 23R on the second end side in the long-side direction Ld. The second support wire 42 linearly extends in parallel with the long-side direction Ld. The second support wire 42 extends to a second side surface 92 on the second end side in the long-side direction Ld of the first layer L1, and is exposed from the second side surface 92. It should be noted that in the present embodiment, no support wire is provided on the opposite side of the second pad 23R to the short linear portion 32 of the second wire main body 21L.

The first inductor wire 20R and the second inductor wire 20L are made of a conductive material. In the present embodiment, the composition of the first inductor wire 20R and the second inductor wire 20L can be such that the copper ratio is 99 wt % or more and the sulfur ratio is 0.1 wt % or more and 1.0 wt % or less (i.e., from 0.1 wt % to 1.0 wt %).

The materials of the first support wire 41 and the second support wire 42 are a conductive material the same as the materials of the first inductor wire 20R and the second inductor wire 20L. However, in the first support wire 41, a part including an exposed surface 41A exposed from the first side surface 91 is a Cu oxide. Similarly, in the second support wire 42, a part including an exposed surface 42A exposed from the second side surface 92 is a Cu oxide.

As shown in FIG. 27, in the first layer L1, a region between the first inductor wire 20R and the second inductor wire 20L is an inner magnetic path 51. The material of the inner magnetic path 51 is a magnetic material. Specifically, the material of the inner magnetic path 51 is an organic resin containing metal magnetic powder made of an iron silica-based alloy or amorphous alloy made of iron silica-based alloys. The metal magnetic powder is an alloy containing iron, and the mean particle size of the metal magnetic powder can be approximately five micrometers. It should be noted that the mean particle size is handled the same as in the first embodiment.

In the first layer L1, when viewed from the thickness direction Td, the region on the second end side in the short-side direction Wd from the first inductor wire 20R and the region on the first end side in the short-side direction Wd from the second inductor wire 20L are the outer magnetic path 52. The material of the outer magnetic path 52 is a magnetic material the same as the material of the inner magnetic path 51.

In the present embodiment, the dimension of the first layer L1 in the thickness direction Td, i.e., the dimensions of the inductor wire 20, the first support wire 41, and the second support wire 42 in the thickness direction Td can be approximately 40 micrometers.

On the under surface that is the surface of the first layer L1 on the lower side in the thickness direction Td, a second layer L2 in a rectangular shape the same as the shape of the first layer L1 when viewed from the thickness direction Td is stacked. The second layer L2 is composed of two insulating resins 61 and an insulating resin magnetic layer 53.

The insulating resin 61 covers the first inductor wire 20R, the second inductor wire 20L, the first support wire 41, and the second support wire 42 from the lower side in the thickness direction Td. When viewed from the thickness direction Td, the insulating resin 61 has a shape that covers a range slightly wider than the outer edges of the first inductor wire 20R, the second inductor wire 20L, the first support wire 41, and the second support wire 42. As a result, the one insulating resin 61 is in a straight belt shape. The other insulating resin 61 has a band shape extending in a nearly L shape. The material of the insulating resin 61 is an insulating resin, and in this embodiment, the material can be a polyimide-based resin, for example. The insulating resin 61 has insulating properties higher than those of those of the inductor wire 20. The two insulating resins 61 are provided side by side in the short-side direction Wd corresponding to the number and the arrangement of the inductor wires 20, and are connected to each other at the ends.

In the second layer L2, parts except the two insulating resins 61 are the insulating resin magnetic layer 53. The material of the insulating resin magnetic layer 53 is a magnetic material the same as the materials of the inner magnetic path 51 and the outer magnetic path 52 described above.

On the under surface that is the surface of the second layer L2 on the lower side in the thickness direction Td, a third layer L3 in a rectangular shape the same as the shape of the second layer L2 when viewed from the thickness direction Td is stacked. The third layer L3 is a first magnetic layer 54. Therefore, the first magnetic layer 54 is disposed on the lower side from the inductor wire 20. The material of the first magnetic layer 54 is an organic resin containing metal magnetic powder the same as the materials of the inner magnetic path 51, the outer magnetic path 52, and the insulating resin magnetic layer 53.

On the other hand, on the top surface that is the surface of the first layer L1 on the upper side in the thickness direction Td, a fourth layer L4 in a rectangular shape the same as the shape of the first layer L1 when viewed from the thickness direction Td is stacked. The fourth layer L4 is formed of two first vertical wires 71, a second vertical wire 72, and a second magnetic layer 55.

The first vertical wire 71 is directly connected to the top surface of the first pad 22R of the first inductor wire 20R with no other layer interposed therebetween. That is, to the first pad 22R, the first vertical wire 71, the first end of the first wire main body 21R, and the first support wire 41 are connected. Similarly, another first vertical wire 71 is directly connected to the top surface of the first pad 22L of the second inductor wire 20L with no other layer interposed therebetween. That is, to the first pad 22L, the first vertical wire 71, the first end of the second wire main body 21L, and the first support wire 41 are connected. The two first vertical wires 71 are disposed at positions in line symmetry relative to the symmetry axis AX. The first vertical wire 71 is made of a material the same as the materials of the first inductor wire 20R and the second inductor wire 20L. The first vertical wire 71 is in a regular quadrangular prism shape, and the axial direction of the regular quadrangular prism is matched with the thickness direction Td.

As shown in FIG. 28, when viewed from the thickness direction Td, the dimensions of the edges of the square-shaped first vertical wire 71 are slightly smaller than the dimensions of the edges of the square-shaped first pad 22R. Therefore, the area of the first pad 22R is larger than the area of the first vertical wire 71 at the connection point to the first pad 22R. When viewed from above in the thickness direction Td, the center axis CV1 of the first vertical wire 71 is matched with the geometric center of the first pad 22R in a nearly square shape. Two first vertical wires 71 are provided corresponding to the number of the first pads 22R.

As shown in FIG. 27, the second vertical wire 72 is directly connected to the top surface of the second pad 23R in the first inductor wire 20R with no other layer interposed therebetween. That is, to the second pad 23R, the second vertical wire 72, the second end of the first wire main body 21R, the second end of the second wire main body 21L, and the second support wire 42 are connected. The second vertical wire 72 is made of a material the same as the material of the first inductor wire 20R. The second vertical wire 72 is in a regular quadrangular prism shape, and the axial direction of the regular quadrangular prism is matched with the thickness direction Td.

As shown in FIG. 28, when viewed from the thickness direction Td, the dimensions of the edges of the square second vertical wire 72 are slightly smaller than the dimensions of the edges of the square second pad 23R. Therefore, the area of the second pad 23R is larger than the area of the second vertical wire 72 at the connection point to the second pad 23R. It should be noted that when viewed from the upper side in the thickness direction Td, the center axis CV2 of the second vertical wire 72 is matched with the geometric center of the second pad 23R in a nearly square shape. One second vertical wire 72 is provided corresponding to the number of the second pads 23R.

As shown in FIG. 27, in the fourth layer L4, parts except the two first vertical wires 71 and the two second vertical wires 72 are a second magnetic layer 55. Therefore, the second magnetic layer 55 is stacked on the top surfaces of the inductor wires 20 and the support wires 41 and 42. That is, the support wires 41 and 42 are directly in contact with the second magnetic layer 55. The material of the second magnetic layer 55 is a material the same as the material of the first magnetic layer 54 described above.

In the inductor component 10, the magnetic layer 50 is composed of the inner magnetic path 51, the outer magnetic path 52, the insulating resin magnetic layer 53, the first magnetic layer 54, and the second magnetic layer 55. The inner magnetic path 51, the outer magnetic path 52, the insulating resin magnetic layer 53, the first magnetic layer 54, and the second magnetic layer 55 are connected to each other, and surround the first inductor wire 20R and the second inductor wire 20L. As described above, the magnetic layer 50 forms a closed magnetic circuit for the first inductor wire 20R and the second inductor wire 20L. Therefore, the first inductor wire 20R and the second inductor wire 20L extend in the inside of the magnetic layer 50. It should be noted that although the inner magnetic path 51, the outer magnetic path 52, the insulating resin magnetic layer 53, the first magnetic layer 54, and the second magnetic layer 55 are shown separately, these components are integrated as the magnetic layer 50, and a boundary is sometimes not confirmed.

On the top surface that is the surface of the fourth layer L4 on the upper side in the thickness direction Td, a fifth layer L5 in a rectangular shape the same as the shape of the fourth layer L4 when viewed from the thickness direction Td is stacked. The fifth layer L5 is composed of four terminal portions 80 and an insulating layer 90. Two of the four terminal portions 80 are first external terminals 81 electrically connected to the first vertical wires 71. One of the four terminal portions 80 is a second external terminal 82 electrically connected to the second vertical wire 72. The remaining one of the four terminal portions 80 except the first external terminals 81 and the second external terminal 82 is a dummy portion 83 that is not electrically connected to any of the first inductor wire 20R and the second inductor wire 20L.

As shown in FIG. 28, when a virtual straight line BX passing the center of the fifth layer L5 in the long-side direction Ld and in parallel with the short-side direction Wd is drawn, a point on the top surface of the fifth layer L5 at which the symmetry axis AX intersects with the virtual straight line BX is a geometric center G of the fifth layer L5. The four terminal portions 80 are disposed at two-fold rotational symmetry positions to the geometric center G of the fifth layer L5 when viewed from the thickness direction Td.

The first external terminal 81 is directly connected to the top surface of the first vertical wire 71 with no other layer interposed therebetween. The first external terminal 81 is in a rectangular shape when viewed from the thickness direction Td, and is also located on the second magnetic layer 55. The area of the first external terminal 81 in contact with the first vertical wire 71 is a half of the overall area of the first external terminal 81 or less. The long side of the rectangle of the first external terminal 81 extends in parallel with the long-side direction Ld of the fifth layer L5, and the short side extends in parallel with the short-side direction Wd of the fifth layer L5. Two first external terminals 81 are provided corresponding to the number of the first vertical wires 71.

The second external terminal 82 is directly connected to the top surface of the second vertical wire 72 with no other layer interposed therebetween. The area of the second external terminal 82 in contact with the second vertical wire 72 is a half of the overall area of the second external terminal 82 or less. The second external terminal 82 is in a rectangular shape when viewed from the thickness direction Td, and is also located on the second magnetic layer 55. The long side of the rectangle of the second external terminal 82 extends in parallel with the long-side direction Ld of the fifth layer L5, and the short side extends in parallel with the short-side direction Wd of the fifth layer L5.

Figure 29:
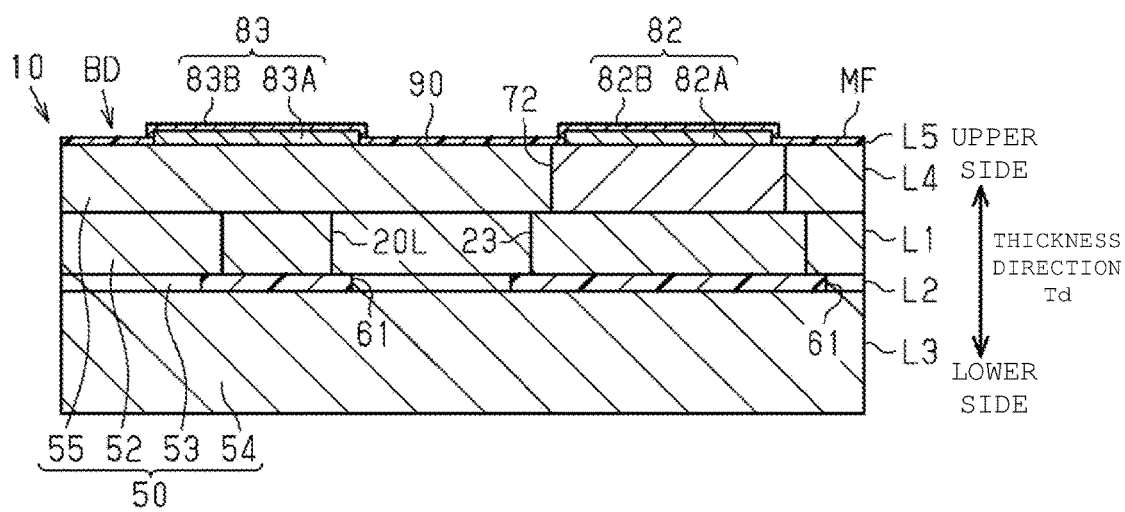
FIG. 29 is a sectional view of the inductor component taken along line 6-6 in FIG. 28.

As shown in FIG. 27, one of the four terminal portions 80 is the dummy portion 83. As shown in FIG. 29, the dummy portion 83 is directly connected to the top surface of the second magnetic layer 55 of the fourth layer L4 with no other layer interposed therebetween. As shown in FIG. 28, the dummy portion 83 has a shape different from the shapes of the first external terminal 81 and the second external terminal 82 when viewed from the thickness direction Td. In the present embodiment, the dummy portion 83 is in an elliptical shape when viewed from the thickness direction Td. On the other hand, the shape of the dummy portion 83 is not limited to this, and may be, for example, a rectangular shape or a circular shape different from the shapes of the first external terminal 81 and the second external terminal 82. The major axis of the ellipse of the dummy portion 83 extends in parallel with the long-side direction Ld of the fifth layer L5, and the minor axis extends in parallel with the short-side direction Wd of the fifth layer L5.

When viewed from the thickness direction Td, most of the dummy portion 83 overlaps with the second inductor wire 20L. More specifically, when viewed from the thickness direction Td, the dummy portion 83 is disposed at a position overlapping with the connection portion 33 of the second inductor wire 20L. When viewed from the thickness direction Td, the area of the dummy portion 83 is the same as the areas of the first external terminal 81 and the second external terminal 82. It should be noted that in the present embodiment, "having the same area" permits manufacturing errors. Therefore, when the difference between the area of the dummy portion 83 and the areas of the first external terminal 81 and the second external terminal 82 is within ±10%, it can be considered that the areas are equal.

When viewed from the thickness direction Td, the second magnetic layer 55 and the first vertical wire 71 provided on the lower side in the thickness direction are sometimes seen through the first external terminal 81. The region in which the first vertical wire 71 is seen through the first external terminal 81 is a region a half of the first external terminal 81 or less when viewed from the thickness direction Td.

Similarly, in the second external terminal 82, the second magnetic layer 55 and the second vertical wire 72 provided on the lower side in the thickness direction Td are sometimes seen through. The region in which the second vertical wire 72 is seen through the second external terminal 82 is a region a half of the second external terminal 82 or less when viewed from the thickness direction Td.

In the dummy portion 83, the second magnetic layer 55 provided on the lower side in the thickness direction Td is sometimes seen through. On the other hand, the region of the second magnetic layer 55 seen through from the first external terminal 81 is a half of the region of the first external terminal 81 or more. The region of the second magnetic layer 55 seen through from the second external terminal 82 is a half of the region of the second external terminal 82 or more. That is, when viewed from the thickness direction Td, the region of the overall dummy portion 83 and the regions a half of the first external terminal 81 and the second external terminal 82 have optically the same color. Here, the same color is regarded as the same color when, for example, a difference between numerical values indicating RGB falls within a predetermined range with the use of a color difference meter. It should be noted that a predetermined range is 10%, for example.

In the fifth layer L5, parts except the terminal portion 80 is the insulating layer 90. In other words, a range of the top surface of the fourth layer L4 that is not covered with the two first external terminals 81, the one second external terminal 82, and the one dummy portion 83 is covered with the insulating layer 90 of the fifth layer L5. When viewed from the thickness direction Td, the outer edge of the terminal portion 80 is in contact with the insulating layer 90. The insulating layer 90 has the insulating properties higher than those of the magnetic layer 50, and in the present embodiment, the insulating layer 90 is a solder resist. The dimension in the thickness direction Td of the insulating layer 90 is smaller than the dimension of any component of the terminal portion 80 in the thickness direction Td.

In the present embodiment, an element body BD is composed of the magnetic layer 50, the insulating resin 61, and the insulating layer 90. That is, the element body BD is in a rectangular shape when viewed from the thickness direction Td. In the present embodiment, the dimension of the element body BD in the thickness direction can be approximately 0.2 mm, for example. The element body BD is parts except wires and terminals having electrical conductivity in the inductor component 10, and parts having insulating properties. The shape of the element body BD is in a rectangular parallelepiped shape as described above, except locally projecting members. It should be noted that when the shape of the element body BD is in a rectangular parallelepiped shape, the stacked parts are included in the element body BD.

In the surface of the element body BD, the surface of the insulating layer 90 on the upper side in the thickness direction Td is a principal surface MF. Therefore, the inductor wire 20 extends in parallel with the principal surface MF of the element body BD. The first vertical wire 71 extends in the thickness direction Td from the first pad 22R of the inductor wire 20 toward the principal surface MF. Similarly, the first vertical wire 71 extends in the thickness direction Td from the first pad 22L of the inductor wire 20 toward the principal surface MF. The first vertical wire 71 is exposed from the principal surface MF. The second vertical wire 72 extends in the thickness direction Td from the second pad 23R of the inductor wire 20 toward the principal surface MF. The second vertical wire 72 is exposed from the principal surface MF. It should be noted that at least parts of the surfaces of the first vertical wire 71 and the second vertical wire 72 exposed from the principal surface MF are sometimes covered with the first external terminal 81 and the second external terminal 82 like the present embodiment.

The terminal portion 80 is exposed from the upper side in the thickness direction Td on the principal surface MF. When viewed from the thickness direction Td, the outer edge of the terminal portion 80 is disposed within the range of the principal surface MF. That is, the first external terminals 81, the second external terminals 82, and the dummy portion 83 are exposed from the outside of the element body BD solely on the principal surface MF of the surface of the element body BD.

The element body BD has a first side surface 93 vertical to the principal surface MF. It should be noted that the first side surface 91 of the first layer L1 is a part of the first side surface 93 of the element body BD. The element body BD has a second side surface 94 that is a side surface vertical to the principal surface MF and in parallel with the first side surface 93. It should be noted that the second side surface 92 of the first layer L1 is a part of the second side surface 94 the element body BD. That is, the first support wire 41 extends from the inductor wire 20 in parallel with the principal surface MF, and the end portion is exposed from the first side surface 93 of the element body BD. Similarly, the second support wire 42 extends from the inductor wire 20 in parallel with the principal surface MF, and the end portion is exposed from the second side surface 94 the element body BD.

In the present embodiment, the geometric center G of the fifth layer L5 is matched with the geometric center of the principal surface MF. When viewed from the thickness direction Td, the geometric center of the principal surface MF is matched with the geometric center of the element body BD.

As shown in FIG. 28, it is assumed that the principal surface MF is virtually divided into a first region and a second region on the virtual straight line BX that passes the geometric center G of the principal surface MF and is in parallel with one side in the short-side direction Wd of the principal surface MF. When the region on the first end side in the long-side direction Ld from the virtual straight line BX is a first region, the dummy portion 83 is not provided in the first region. When the region on the second end side in the long-side direction Ld from the virtual straight line BX is a second region, in the second region, the dummy portions 83 in the same number as the number of the second external terminals 82 provided in the second region are provided.

Next, the wires will be described in detail.

As shown in FIG. 28, when viewed from the thickness direction Td, the center axis C1 of the first wire main body 21R extends in the long-side direction Ld. It should be noted that the center axis C1 of the first wire main body 21R is a line that follows the intermediate points of the first wire main body 21R in the direction orthogonal to the direction in which the first wire main body 21R extends, i.e., in the short-side direction Wd. In the present embodiment, the line width of the wire main bodies 21 is 50 micrometers, for example.

As described above, the center axis C2 of the second wire main body 21L of the second inductor wire 20L extends in a nearly L shape. Here, the wire length of the long linear portion 31 of the second wire main body 21L is longer than the wire length of the first wire main body 21R. In addition to this, the second wire main body 21L has the connection portion 33 and the short linear portion 32. Therefore, the wire length of the second wire main body 21L is longer than the wire length of the first wire main body 21R. Specifically, the wire length of the second wire main body 21L is 1.2 times or more the wire length of the first wire main body 21R.

The inductance value of the second inductor wire 20L is 1.1 times or more the inductance value of the first inductor wire 20R in the reflection of the difference in the wire length. In the present embodiment, the inductance value of the first inductor wire 20R is approximately 2.5 nH, for example.

The first wire main body 21R of the first inductor wire 20R extends along one side of the outer edge of the element body BD in the long-side direction Ld. When viewed from the thickness direction Td, the first pad 22L and the second pad 23R of the second inductor wire 20L are disposed at a position in symmetry to the geometric center G. In the present embodiment, the first pad 22L and the second pad 23R of the second inductor wire 20L are disposed at positions in two-fold symmetry to the geometric center G.

The first inductor wire 20R has parallel portions extending in parallel with the second inductor wire 20L. Specifically, the first wire main body 21R and the long linear portion 31 of the second wire main body 21L correspond to the parallel portions. The first wire main body 21R and the long linear portion 31 are arranged side by side in the short-side direction Wd in the first layer L1. It should be noted that the parallel portions may be substantially parallel, and a manufacturing error is permitted.

In the following description, a distance between the center axis C1 of the first wire main body 21R in the short-side direction Wd and the center axis C2 of the long linear portion 31 of the second wire main body 21L is defined as a pitch X1 between the wire main bodies. The pitch between the wire main bodies is a pitch between adjacent parallel portions. The gap between the parallel portions of the inductor wires adjacent to each other, i.e., the distance between the first end side of the first wire main body 21R in the short-side direction Wd and the second end side of the long linear portion 31 of the second wire main body 21L in the short-side direction Wd in FIG. 28 is approximately 200 micrometers, for example.

As shown in FIG. 28, the distance from the center axis C1 of the first wire main body 21R to the end of the element body in the short-side direction Wd closest to the first wire main body 21R, i.e., the end on the second end side is defined as a first distance Y1. A distance from the center axis C2 of the long linear portion 31, which is a parallel portion of the second inductor wire 20L, to an end of the element body BD in the short-side direction Wd closest to the long linear portion 31, i.e., an end on the first end side is defined as a second distance Y2. In the present embodiment, the first distance Y1 has the same dimension as the second distance Y2.

In the short-side direction Wd, the pitch X1 between the wire main bodies is different in dimension from the first distance Y1 and the second distance Y2. Specifically, the pitch X1 between the wire main bodies can be approximately "250 micrometers". The first distance Y1 and the second distance Y2 can be approximately "175 micrometers". As described above, the first distance Y1 and the second distance Y2 are preferably slightly longer than a half of the pitch X1.

When viewed from the thickness direction Td, the center axis A1 of the first support wire 41 connected to the first pad 22R of the first inductor wire 20R extends in the long-side direction Ld. The center axis A1 of the first support wire 41 is located on the outer side of the center axis C1 of the first wire main body 21R in the short-side direction Wd. That is, the extension line of the center axis A1 of the first support wire 41 connected to the first inductor wire 20R is not matched with the center axis C1 of the first wire main body 21R. Therefore, the center axis A1 of the first support wire 41 and the center axis C1 of the first wire main body 21R are located on different straight lines. The extension line of the center axis A1 of the first support wire 41 intersects with the center axis CV1 of the first vertical wire 71.

The center axis A1 of the first support wire 41 connected to the first pad 22L of the second inductor wire 20L extends in the long-side direction Ld. The center axis A1 of the first support wire 41 is located on the outer side of the center axis C2 of the second wire main body 21L, more specifically, on the outer side from the center axis C2 of the long linear portion 31 in the short-side direction Wd. That is, the extension line of the center axis A1 of the first support wire 41 connected to the second inductor wire 20L is not matched with the center axis C2 of the second wire main body 21L. Therefore, the center axis A1 of the first support wire 41 and the center axis C2 of the second wire main body 21L are located on different straight lines. The extension line of the center axis A1 of the first support wire 41 intersects with the center axis CV1 of the first vertical wire 71. It should be noted that the first support wire 41 connected to the first inductor wire 20R and the first support wire 41 connected to the second inductor wire 20L are disposed in line symmetry relative to the symmetry axis AX.

When viewed from the thickness direction Td, the center axis A2 of the second support wire 42 extends in the long-side direction Ld. The center axis A2 of the second support wire 42 is located on the outer side of the center axis C1 of the first wire main body 21R in the short-side direction Wd. That is, the extension line of the center axis A2 of the second support wire 42 is not matched with the center axis C1 of the first wire main body 21R. Therefore, the center axis A2 of the second support wire 42 and the center axis C1 of the first wire main body 21R are located on different straight lines. The second vertical wire 72 is disposed on the extension line of the center axis A2 of the second support wire 42. The extension line of the center axis A2 of the second support wire 42 intersects with the center axis CV2 of the second vertical wire 72.

The first support wire 41 and the second support wire 42 extending from the first inductor wire 20R are disposed at the same position in the short-side direction Wd. That is, the center axis A1 of the first support wire 41 and the center axis A2 of the second support wire 42 are located on the same straight line. It should be noted that similarly to the first embodiment, when a displacement is within 10% based on the minimum line width of the first inductor wire 20R and the second inductor wire 20L, the center axes A1 and A2 are regarded as located on the same straight line. Specifically, the minimum line width of the inductor wire 20 in the present embodiment is 50 micrometers, which is the line width of the first wire main body 21R and the second wire main body 21L.

As described above, in the first layer L1, the first support wires 41 are disposed in line symmetry relative to the symmetry axis AX. Therefore, as shown in FIG. 28, a distance Q1 from the end of the element body BD on the second end side in the short-side direction Wd to the center axis A1 of the first support wire 41 extending from the first inductor wire 20R is the same as a distance Q2 from the end of the element body BD on the first end side in the short-side direction Wd to the center axis A1 of the first support wire 41 extending from the second inductor wire 20L.

On the other hand, in the short-side direction Wd, the pitch P1 from the center axis A1 of the first support wire 41 extending from the first inductor wire 20R to the center axis A1 of the first support wire 41 extending from the second inductor wire 20L is larger than the distance Q1 and the distance Q2 described above. Specifically, the pitch P1 is a length approximately twice the distance Q1 and the distance Q2.

In the present embodiment, the sectional area of the first wire main body 21R in the section orthogonal to the center axis C1 of the first wire main body 21R is equal to the sectional area of the second wire main body 21L. It should be noted that in the present application, when the displacement between the sectional areas of the first wire main body 21R and the second wire main body 21L is within 10%, the sectional areas are regarded as equal.

The sectional area of the first support wire 41 in the section orthogonal to the center axis A1 of the first support wire 41 is smaller than the sectional areas of the first wire main body 21R and the second wire main body 21L described above. The sectional area of the second support wire 42 in the section orthogonal to the center axis A2 of the second support wire 42 is also smaller than the sectional areas of the first wire main body 21R and the second wire main body 21L described above.

Figure 30:
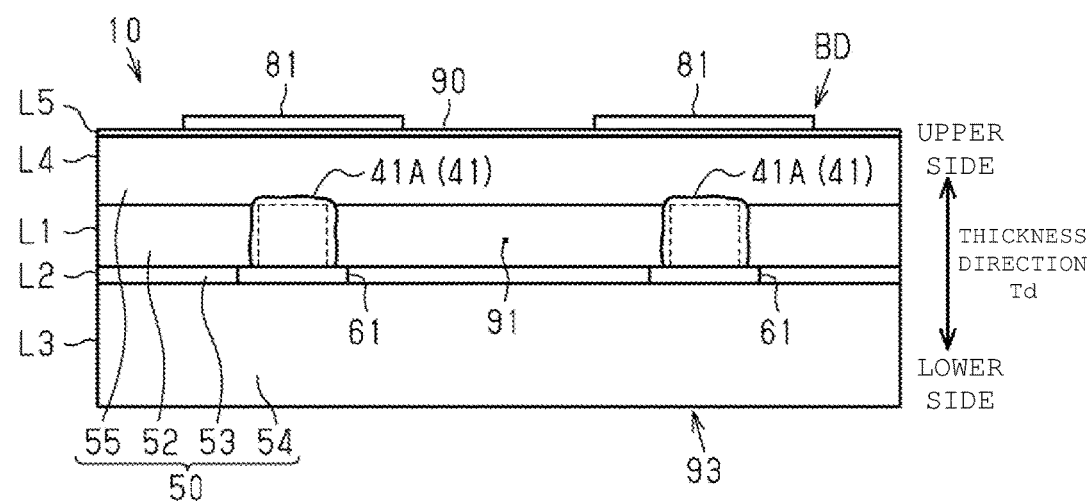
FIG. 30 is a side view showing the first side surface of the inductor component according to the second embodiment.

As shown in FIG. 30, ends of the two first support wires 41 are exposed from the first side surface 91 of the element body BD on the first end side in the long-side direction Ld. The shape of the exposed surface 41A of each first support wire 41 exposed from the first side surface 93 is a shape in which the sectional shape of the first support wire 41 orthogonal to the center axis A1 is slightly extended in the short-side direction Wd. As a result, the area of the exposed surface 41A of the first support wire 41 is larger than the sectional area of the first support wire 41 in the inside of the element body BD in the section orthogonal to the center axis A1. Similarly, as shown in FIG. 27, the area of the exposed surface 42A of the second support wire 42 exposed from the second side surface 94 is larger than the sectional area of the second support wire 42 in the inside of element body BD in the section orthogonal to the center axis A2. As a result, the contact areas of the first support wire 41 and the second support wire 42 with the first side surface 93 and the second side surface 94 of the element body BD are increased, and the close contact property to each other is improved. It should be noted that the size of the sectional area only has to satisfy the relationship above, and for example, the exposed surface 41A may be in a shape in which the exposed surface 41A extends to one side and another side is covered with the extending part of the element body BD.

It should be noted that the number of the first support wires 41 exposed from the first side surface 93 is two, the number of the second support wires 42 exposed from the second side surface 94 is one, and the number of the exposed support wires is different.

Next, the external terminal will be described in detail.

As shown in FIG. 29, the second external terminal 82 has a second conducting portion 82A and a second insulating portion 82B. The second conducting portion 82A is directly connected to the top surface of the second vertical wire 72 with no other layer interposed therebetween. The material of the second conducting portion 82A includes a metal, and is copper in the present embodiment.

On the second conducting portion 82A, the second insulating portion 82B is stacked. In the present embodiment, in the surface of the second conducting portion 82A, the surfaces except the surface in contact with the second vertical wire 72 and the surface in contact with the insulating layer 90 are covered with the second insulating portion 82B. The material of the second insulating portion 82B is a copper oxide. That is, the material of the second insulating portion 82B is a metal oxide of the metal material of the second conducting portion 82A. Therefore, the second insulating portion 82B has the insulating properties higher than those of the second conducting portion 82A. The dimension of the second insulating portion 82B in the thickness direction Td is 1.5 micrometers or less.

As described above, in the second external terminal 82, the second conducting portion 82A is covered with the second insulating portion 82B, and insulated from the outside of the element body BD. It should be noted that in the present embodiment, as shown in FIG. 28, the first external terminal 81 has a first conducting portion 81A and a first insulating portion 81B. The dummy portion 83 has a third conducting portion 83A and a third insulating portion 83B. The first conducting portion 81A and the first insulating portion 81B of the first external terminal 81 and the third conducting portion 83A and the third insulating portion 83B of the dummy portion 83 are similar to the second conducting portion 82A and the second insulating portion 82B of the second external terminal 82, and the detailed description thereof is omitted.

In the inductor component 10, the DC electrical resistance of the parts from the first conducting portion 81A of the first external terminal 81 to the second conducting portion 82A of the second external terminal 82 with the first vertical wire 71, the first inductor wire 20R, and the second vertical wire 72 interposed therebetween can be measured by a four-terminal method. The total value of the DC electrical resistance of the first insulating portion 81B of the first external terminal 81 and the DC electrical resistance of the second insulating portion 82B of the second external terminal 82 is larger than the DC electrical resistance of the parts above.

In the present embodiment, the DC electrical resistance of the parts from the first conducting portion 81A of the first external terminal 81 to the second conducting portion 82A of the second external terminal 82 with the first vertical wire 71, the inductor wire 20, and the second vertical wire 72 interposed therebetween is 1 mΩ or more and 50 mΩ or less (i.e., from 1 mΩ to 50 mΩ). The inductance value obtained in the case in which an electric current is flowed through these parts is 1 nH or more and 10 nH or less (i.e., from 1 nH to 10 nH). The method of measuring the inductance value is similar to that of the first embodiment.

Similarly, the DC electrical resistance of a portion from the first conducting portion 81A of the first external terminal 81 to the second conducting portion 82A of the second external terminal 82 with the first vertical wire 71, the second inductor wire 20L, and the second vertical wire 72 interposed therebetween can be measured by a four-terminal method. The total value of the DC electrical resistance of the first insulating portion 81B of the first external terminal 81 and the DC electrical resistance of the second insulating portion 82B of the second external terminal 82 is larger than the DC electrical resistance of the parts above. The direct current electric resistance of these parts is 1 mΩ or more and 50 mΩ or less (i.e., from 1 mΩ to 50 mΩ), and the inductance value obtained in the case in which an electric current is flowed through these parts is 1 nH or more and 10 nH or less (i.e., from 1 nH to 10 nH).

A manufacturing method for an inductor component 10 according to the second embodiment will be described. In the manufacturing method for an inductor component 10 according to the second embodiment, points different from the manufacturing method for an inductor component 10 according to the first embodiment will be described below.

In the insulating layer forming step in the second embodiment, on the parts on which the terminal portion 80 is not formed on the top surface of the second magnetic layer 55 and the top surfaces of the vertical wires, a solder resist that functions as the insulating layer 90 is patterned by photolithography. It should be noted that in the present embodiment, the direction orthogonal to the top surface of the insulating layer 90, i.e., the principal surface MF of the element body BD is the thickness direction Td.

In the terminal portion forming step in the second embodiment, on the parts that are not covered with the insulating layer 90 on the top surface of the second magnetic layer 55 and the top surfaces of the vertical wires, the first external terminal 81, the second external terminal 82, and the dummy portion 83 are formed. Specifically, the first conducting portion 81A, the second conducting portion 82A, and the third conducting portion 83A are formed by electroless plating of copper. Subsequently, the surfaces of the first conducting portion 81A, the second conducting portion 82A, and the third conducting portion 83A are oxidized by high temperature treatment to form the first insulating portion 81B, the second insulating portion 82B, and the third insulating portion 83B made of copper oxide. Thus, the first external terminal 81, the second external terminal 82, and the dummy portion 83 are formed.

Figure 31:
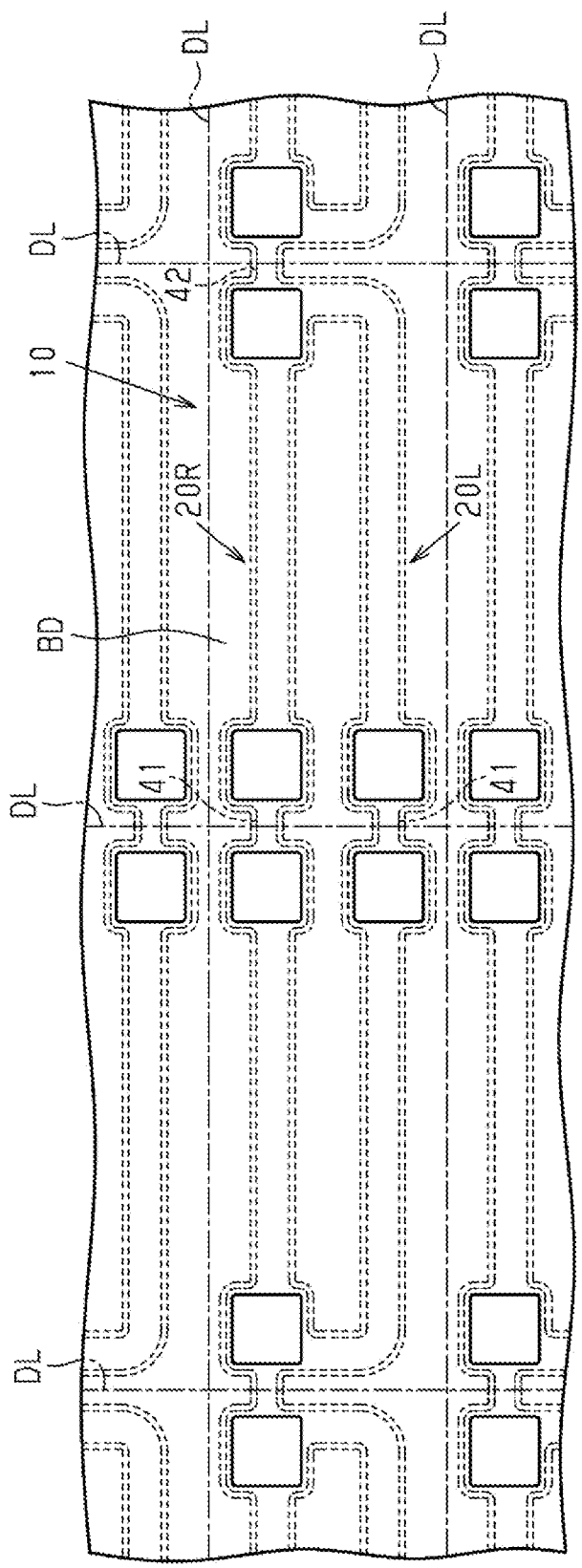
FIG. 31 is an explanatory diagram of the manufacturing method for an inductor component according to the second embodiment.

In the dicing step according to the second embodiment, as shown in FIG. 31, die separation is performed by cutting with a dicing machine at break lines DL. As a result, the inductor component 10 can be obtained.

In the state before cutting with a dicing machine, for example, as shown in FIG. 31, a plurality of the inductor components is arranged side by side in the long-side direction Ld and in the short-side direction Wd, and the individual inductor components are connected to each other in a form of the element body BD through the first support wires 41 and the second support wires 42. Specifically, the first support wire 41 is connected to each other, and the second support wire 42 is connected to each other. The first support wires 41 and the second support wires 42 included on the break lines DL are cut in the thickness direction Td, and the section of the first support wire 41 is exposed as the exposed surface 41A from the first side surface 93. The section of the second support wire 42 is exposed as the exposed surface 42A to the second side surface 94.

Next, the effects of the second embodiment will be described. In addition to the effects (1-1) to (1-6) and (1-9) to (1-13) of the first embodiment described above, the inductor component 10 according to the second embodiment further exerts the following effects.

(2-1) In the second embodiment, the dummy portion 83 is provided on the fifth layer L5. When viewed from the thickness direction Td, the area of the dummy portion 83 is equal to the areas of the first external terminal 81 and the second external terminal 82. Therefore, when the dummy portion 83 is soldered to the substrate or the like in the same manner as the first external terminal 81 and the second external terminal 82, the amount of solder applied to these four terminal portions 80 can be made uniform. Therefore, it is possible to suppress mounting the inductor component 10 on a substrate or the like in an inclined from.

(2-2) In the second embodiment, the dummy portion 83 has the third insulating portion 83B in the configuration similar to the configurations of the first insulating portion 81B and the second insulating portion 82B. Therefore, the dummy portion 83 can be formed in the same process as the first external terminal 81 and the second external terminal 82.

(2-3) In the embodiment, the wire length of the first wire main body 21R is different from the wire length of the second wire main body 21L. Therefore, the inductance value can be switched to a different inductance value depending on which of the first pad 22R and the first pad 22L an electric current is flowed.

The foregoing embodiments can be modified and carried out as follows. The foregoing embodiments and exemplary modifications below can be implemented in combination within a range that is not technically contradictory.

Figure 32:
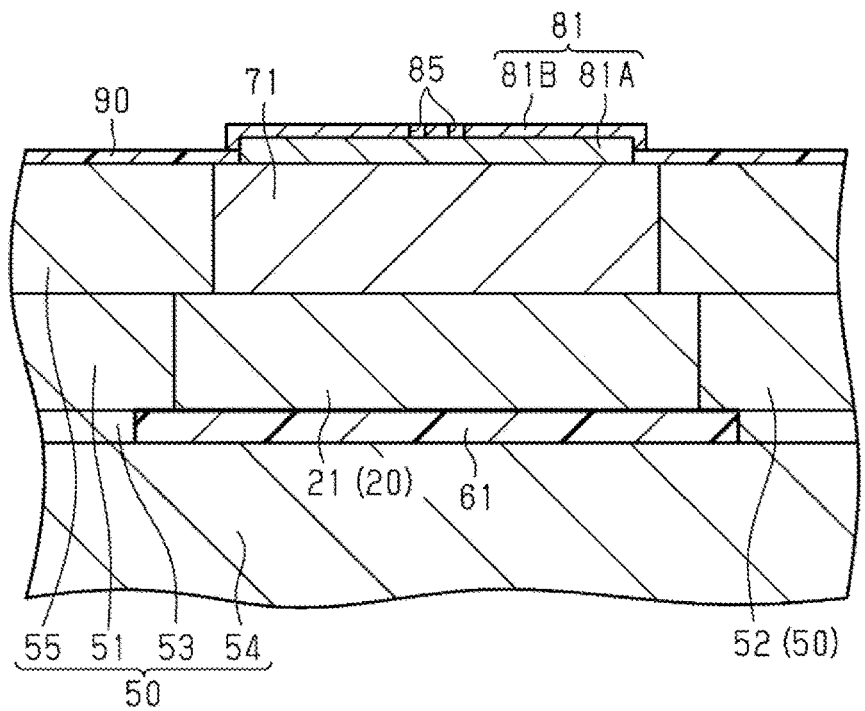
FIG. 32 is a partial sectional view of an inductor component according to an example modification.

The first insulating portion 81B of the first external terminal 81 may have a fine through hole penetrating the first insulating portion 81B. When the diameter of each through-hole is sufficiently small, it can be said that the first conducting portion 81A is insulated from the outside of the element body BD when 90 percent or more of the overall first conducting portion 81A is covered with the first insulating portion 81B, although all of the first conducting portion 81A is not covered with the first insulating portion 81B. In an example shown in FIG. 32, two through holes 85 penetrate through the first insulating portion 81B. The diameter of each through hole 85 is ten micrometers, and is one-tenth of the maximum Feret diameter of the first external terminal 81 or less. The maximum Feret diameter of the first external terminal 81 is the largest dimension among the dimensions in the direction orthogonal to the thickness direction Td of a projected image when the first external terminal 81 is projected from the direction orthogonal to the thickness direction Td. For example, in the case of the foregoing embodiments, since the first external terminal 81 is in a rectangular shape when viewed from the thickness direction Td, the dimension of the diagonal line of the rectangle is the maximum Feret diameter.

When the diameter of the through hole 85 is sufficiently small as described above, for example, the inductor components 10 are not electrically connected to each other on the occasion in which the first external terminals 81 of the inductor components 10 are brought into contact with each other in storage the inductor components 10, and thus it can be said that the inductor components 10 are insulated from each other with the first insulating portion 81B.

In the case in which the DC electric resistance of the inductor component 10 is measured, a so-called 4-terminal method is sometimes used. In this case, a measurement pin is pierced into the first external terminal 81, and the direct current electric resistance of the first external terminal 81 is measured. In this case, as in the example shown in FIG. 32, the through hole 85 is sometimes formed in the first insulating portion 81B.

In the inductor component 10, the DC electrical resistance of the parts from the first conducting portion 81A of the first external terminal 81 to the second conducting portion 82A of the second external terminal 82 with the first vertical wire 71, the inductor wire 20, and the second vertical wire 72 interposed therebetween can vary depending on the configuration of the inductor wire 20. For example, in the case in which the number of turns of the inductor wire 20 is large or the sectional area of the inductor wire 20 is small, the DC electric resistance of the part increases. The inductance value of the above portion can also vary depending on the configuration of the inductor wire 20, the material of the element body BD, and the like.

Figure 33:
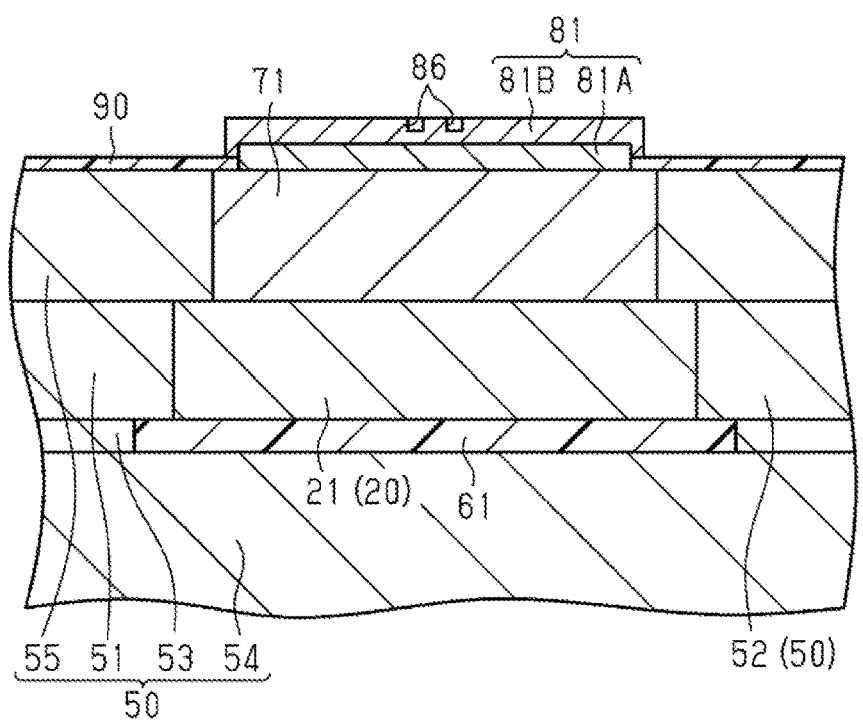
FIG. 33 is a partial sectional view of the inductor component according to the example modification.

As shown in FIG. 33, the first insulating portion 81B of the first external terminal 81 may include a recess 86 recessed toward the first conducting portion 81A side. Such a recess 86 may be formed, for example, when the DC electric resistance of the first external terminal 81 described above is measured. First, as in the example shown in FIG. 32, a configuration may be provided in which after the through hole 85 is formed in the first insulating portion 81B of the first external terminal 81, the insulating portion is formed by oxidizing the first conducting portion 81A exposed from the first insulating portion 81B through the through hole 85 by additional heat treatment in order to further enhance the insulating property.

The configurations of the insulating portions are not limited to the examples of the foregoing embodiments. For example, in an example shown in FIG. 34, the first insulating portion of a first external terminal 181 has an insulating portion 181B containing a metal oxide, and an insulating portion 181C made of a resin and stacked on the insulating portion 181B. In this case, with the use of the insulating portion 181C made of a resin, the first insulating portion is easily formed in a wider range than the insulating portion 181B containing a metal oxide.

Figure 34:
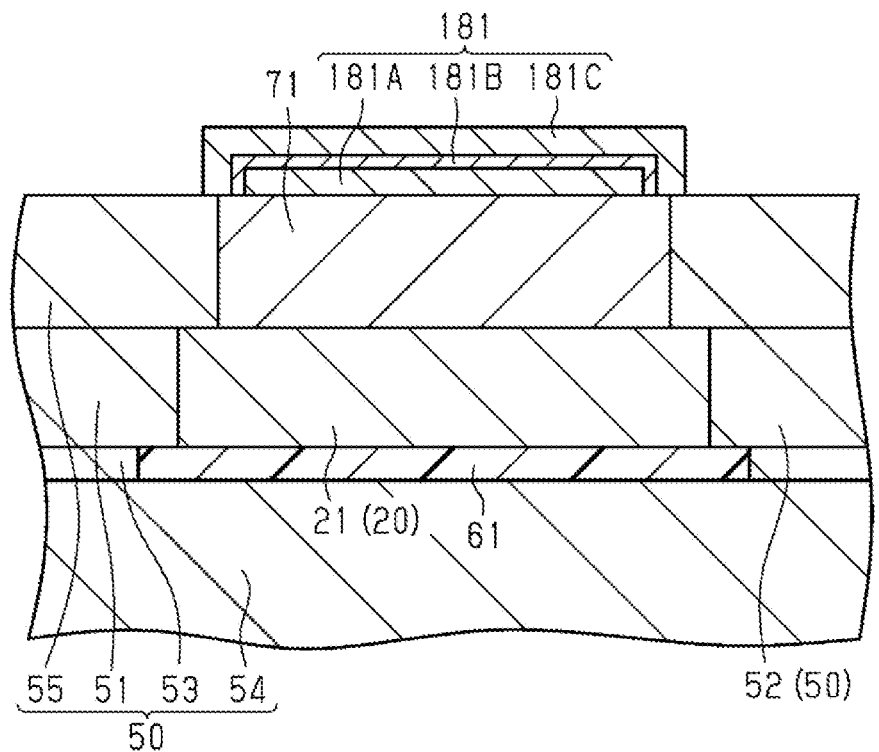
FIG. 34 is a partial sectional view of the inductor component according to the example modification.

In the example shown in FIG. 34, the insulating portion 181B containing a metal oxide may be omitted. That is, the first insulating portion may include solely the insulating portion 181C made of a resin.

In the foregoing embodiments, a configuration may be provided in which the first insulating portion 81B of the first external terminal 81 and the second insulating portion 82B of the second external terminal 82 are omitted, and instead, the outer surfaces of the first conducting portion 81A of the first external terminal 81 and the second conducting portion 82A of the second external terminal 82 are covered with the insulating layer 90.

In the foregoing embodiments, the configurations of the first conducting portion 81A and the second conducting portion 82A are not limited to the examples of the foregoing embodiments. For example, the first conducting portion 81A of the first external terminal 81 may have a two-layer structure having a layer made of copper and a layer made of nickel. In this case, the first insulating portion 81B may contain a nickel oxide and a copper oxide.

In addition to this, the first conducting portion 81A, the second conducting portion 82A, and the third conducting portion 83A may be nickel and gold, or nickel and tin. A catalyst layer may be provided as necessary. For example, nickel can suppress electromigration, gold or tin can ensure solder wettability, and the conductive layers of the external terminals can be appropriately set corresponding to functions.

In the foregoing embodiments, the thicknesses of the first insulating portion 81B and the second insulating portion 82B may be larger than 1.5 micrometers. It should be noted that in the case in which the first insulating portion 81B is made of a metal oxide of a metal forming the first conducting portion 81A, the boundary between the first insulating portion 81B and the first conducting portion 81A is not always clear depending on the method for forming the first insulating portion 81B. In the case in which the boundary is not clear as described above, the part from which the metal oxide can be detected is the first insulating portion 81B. At this point, the same applies to the second insulating portion 82B and the second conducting portion 82A.

In the foregoing embodiments, the first insulating portion 81B may be an oxide of metal that is not included in the first conducting portion 81A. For example, the first insulating portion 81B may include a resin layer and a metal oxide layer stacked on the resin layer. In this case, a metal may be stacked on the resin layer to oxidize the whole. At this point, the same applies to the second insulating portion 82B.

In the foregoing embodiments, the metal oxide contained in the first insulating portion 81B is not limited to copper oxide. The metal oxide contained in the first insulating portion 81B may be appropriately changed depending on the material of the first conducting portion 81A.

In the second embodiment, the third insulating portion 83B is not necessary for the dummy portion 83 of the terminal portion 80. Since the dummy portion 83 is not electrically connected to the first inductor wire 20R and the second inductor wire 20L, an unintentional electric current is unlikely to be flowed through the first inductor wire 20R and the second inductor wire 20L on the occasion in which the dummy portion 83 touches a terminal or the like of another component.

The number of the inductor wires 20 in the inside of element body BD may be one. Three or more inductor wires 20 may be provided. The number of support wires exposed from the first side surface 91 and the second side surface 92 may be three or more in accordance with the number of the inductor wires 20. The plurality of inductor wires 20 may be disposed in different layers.

In the foregoing embodiments, the inductor wire 20 may be any wiring capable of imparting inductance to the inductor component 10 by generating a magnetic flux in the magnetic layer in the case in which an electric current is flowed.

Figure 35:
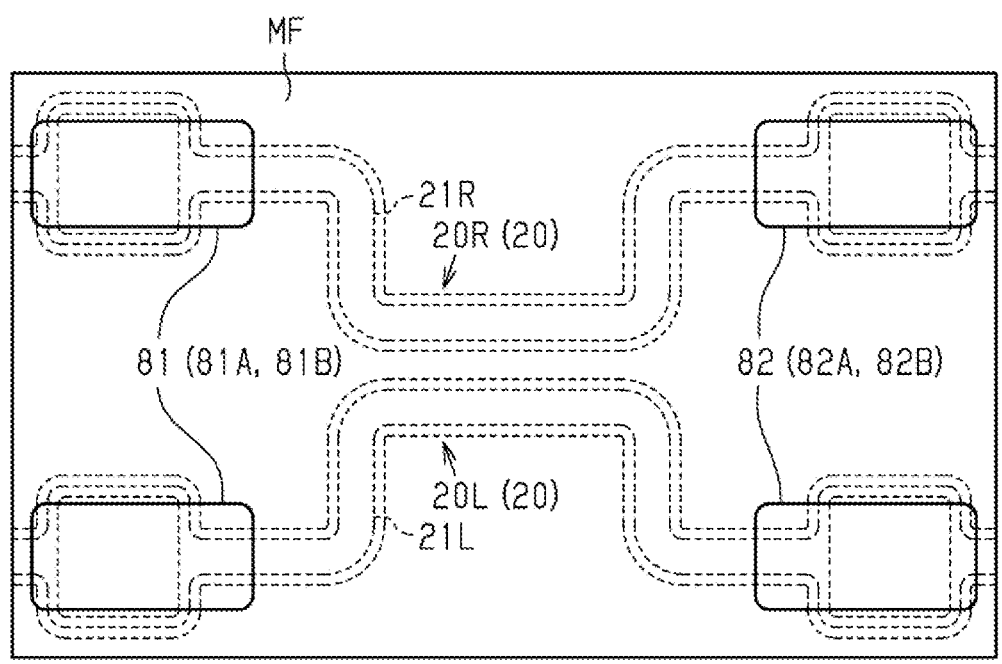
FIG. 35 is a transparent top view showing the inductor component according to the example modification.

The shape of the inductor wire 20 is not limited to the examples of the foregoing embodiments. For example, in the example shown in FIG. 35, the first wire main body 21R of the first inductor wire 20R and the second wire main body 21L of the second inductor wire 20L are in a meander shape. For example, the wire main body 21 of the inductor wire 20 may be in a wave shape.

Figure 36:
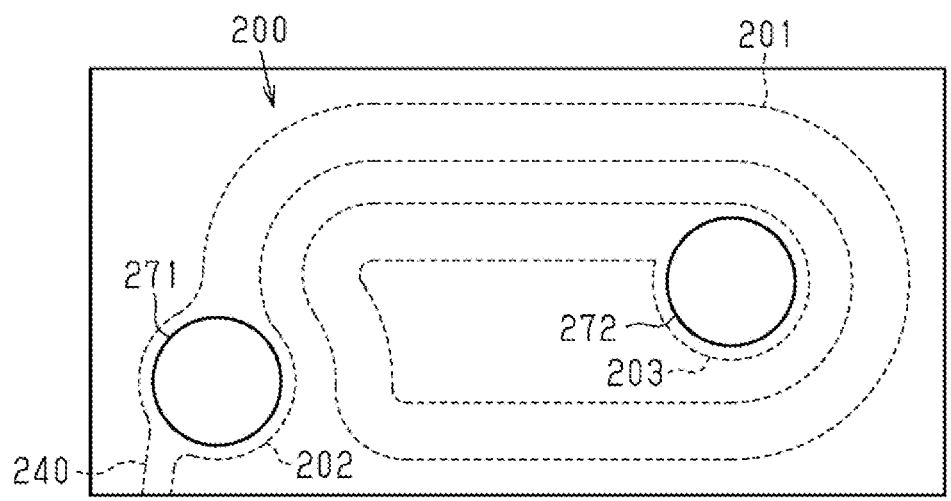
FIG. 36 is a transparent top view of an inductor component according to an exemplary modification.

For example, the wire main body 21 of the inductor wire 20 may be in a spiral shape. In the example shown in FIG. 36, when viewed in the thickness direction Td, a wire main body 201 of an inductor wire 200 extends clockwise from the radially outer side toward the radially inner side. In this example, the number of turns of the wire main body 201 is 1.25. To the first end of the wire main body 201, a first pad 202 is connected. To the second end of the wire main body 201, a second pad 203 is connected. The first pad 202 and the second pad 203 are in a circular shape when viewed in the thickness direction Td. To the first pad 202, an external terminal is connected with a first vertical wire 271 interposed therebetween. To the second pad 203, an external terminal is connected with the second vertical wire 272 interposed therebetween. Although not shown in the drawings, the external terminals include a conducting portion and an insulating portion. To first pad 202, a support wire 240 is connected.

In the foregoing embodiments, the dimension of the element body BD in the thickness direction Td is not limited to the examples of the foregoing embodiments. For example, the dimension of the element body BD in the thickness direction Td may be larger than the dimension in the short-side direction Wd of the element body BD. However, as described above, the smaller the dimension of the element body BD in the thickness direction Td becomes, the smaller the dimension protruding from the substrate in mounting the inductor component 10 on the substrate becomes, which is preferable. Specifically, the thickness may be preferably 0.25 mm or less.

In the foregoing embodiments, the position of the first support wire 41 is not limited to the examples of the foregoing embodiments. For example, the position of the center axis A1 of the first support wire 41 in the short-side direction Wd may be the same as the position of the center axis C1 of the wire main body 21 of the inductor wire 20 that is connected in the short-side direction Wd. It should be noted that in the case in which the wire main body 21 includes a cured part, when the end portion of the wire main body 21 on the pad side is in a linear shape, the center axis A1 of the first support wire may be displaced to the center axis at the linear portion.

In the foregoing embodiments, the number of support wires exposed from the first side surface 93 and the second side surface 94 may be three or more or all may be omitted in association with the number of inductor wires 20.

In the foregoing embodiments, the mean particle size of the metal magnetic powder contained in the magnetic layer 50 is not limited to the examples of the foregoing embodiments. However, in order to ensure the relative permeability, the mean particle size of the metal magnetic powder is preferably one micrometer or more and ten micrometers or less (i.e., from one micrometer to ten micrometers).

In the foregoing embodiments, the metal magnetic powder included in the first magnetic layer 54 and the second magnetic layer 55 do not necessarily have to be metal powder containing Fe. For example, metal powder containing Ni or Cr may be used.

In the foregoing embodiments, the minimum gap between the inductor wires 20 adjacent to each other does not necessarily have to be provided between the pads, and may be provided between the wire main bodies 21. However, from the viewpoint of insulation between the inductor wires 20, the minimum gap is preferably 50 micrometers or more.

In the foregoing embodiments, the composition of the inductor wires 20 is not limited to the examples of the foregoing embodiments. For example, silver or gold may be used.

In the foregoing embodiments, the composition of the magnetic layer 50 is not limited to the examples of the foregoing embodiments. For example, the material of the magnetic layer 50 may be ferrite powder or a mixture of ferrite powder and metal magnetic powder.

In the foregoing embodiments, another layer may be interposed between the support wires 41 and 42 and the magnetic layer 50. For example, an insulating layer may be interposed between the support wires 41 and 42 and the magnetic layer 50.

In the foregoing embodiments, the first vertical wire 71 and the second vertical wire 72 do not necessarily have to solely extend in the direction orthogonal to the principal surface MF. For example, the first vertical wire 71 and the second vertical wire 72 only have to penetrate the second magnetic layer 55 on the occasion in which the first vertical wire 71 and the second vertical wire 72 are inclined to the thickness direction Td.

In the foregoing embodiments, the areas of the first pad and the second pad may be equal to the areas of the first vertical wires 71 and the second vertical wires 72 when viewed from the thickness direction Td. The dimensions of the lengths of the first pad and the second pad in the direction orthogonal to the direction of extending the wire main body may be the same as that of the wire main body.

In the second embodiment, the dummy portion 83 does not necessarily have to be made of a material the same as the material of the first external terminal 81 and the second external terminal 82. For example, the dummy portion 83 does not necessarily have to be a material having conductivity. Furthermore, for example, the dummy portion 83 may be a part that the second magnetic layer 55 is exposed from the insulating layer 90.

In the second embodiment, the area of the dummy portion 83 when viewed from the thickness direction Td may be different from the areas of the first external terminal 81 and the second external terminal 82.

In the second embodiment, the dummy portion 83 may does not necessarily have to be provided.

In the embodiment, the manufacturing method for an inductor component 10 is not limited to the examples of the foregoing embodiments. For example, in the first embodiment and the second embodiment, the step of forming the inductor wire 20 and the step of forming the first support wire 41 and the second support wire may be different steps. For example, after the inductor wire 20 is formed, the support wires 41 and 42 may be formed of a material different from that of the inductor wire 20.

What is claimed is:

1. An inductor component comprising:
   an element body having a principal surface;
   at least one inductor wire extending in parallel with a long-side direction of the principal surface in an inside of the element body;
   a vertical wire extending from the at least one inductor wire in a thickness direction orthogonal to the principal surface, the vertical wire including a portion exposed from the principal surface; and
   an external terminal disposed on the principal surface to cover the portion of the vertical wire exposed from the principal surface,
   the external terminal including a conducting portion including a metal, and an insulating portion covering the conducting portion and having a higher insulation property than an insulation property of the conducting portion, and
   the conducting portion being insulated from an outside of the element body by the insulating portion, wherein
   a central axis of the vertical wire is located on a different straight line than a center axis of the at least one inductor wire at a connecting site between the vertical wire and the at least one inductor wire.

2. The inductor component according to claim 1, wherein a material of the insulating portion is a resin.

3. The inductor component according to claim 1, wherein a material of the insulating portion includes a metal oxide.

4. The inductor component according to claim 3, wherein a dimension of the insulating portion in the thickness direction is 1.5 micrometers or less.

5. The inductor component according to claim 3, wherein the metal oxide is an oxide of metal contained in the conducting portion.

6. The inductor component according to claim 3, wherein the metal oxide is a copper oxide.

7. The inductor component according to claim 1, comprising:
   a plurality of the inductor wires.

8. The inductor component according to claim 1, further comprising:
   when the vertical wire is a first vertical wire,
   a second vertical wire extending from the at least one inductor wire in the thickness direction, the second vertical wire including a second portion exposed from the principal surface,
wherein
   the at least one inductor wire includes a wire main body that extends linearly, a first pad which is provided at a first end of the wire main body and to which the first vertical wire is directly connected, and a second pad which is provided at a second end of the wire main body and to which the second vertical wire is directly connected.

9. The inductor component according to claim 1, wherein the conducting portion has a structure in which a plurality of layers of different materials is stacked.

10. The inductor component according to claim 1, wherein the insulating portion includes a recess recessed toward the conducting portion.

11. The inductor component according to claim 1, wherein the insulating portion has a structure in which a plurality of layers of different materials is stacked.

12. The inductor component according to claim 1, further comprising:

when the vertical wire is a first vertical wire, the external terminal is a first external terminal, the portion of the first vertical wire is a first portion, the conducting portion is a first conducting portion, and the insulating portion is a first insulating portion, a second vertical wire extending from the at least one inductor wire in the thickness direction, the second vertical wire including a second portion exposed from the principal surface; and a second external terminal disposed on the principal surface to cover the second portion exposed from the principal surface, wherein the second external terminal includes a second conducting portion containing a metal, and a second insulating portion covering the second conducting portion, the second insulating portion having an insulating property higher than an insulating property of the second conducting portion, and a total value of a DC electrical resistance of the first insulating portion and a DC electrical resistance of the second insulating portion is larger than a DC electrical resistance of a portion from the first conducting portion to the second conducting portion with the first vertical wire, the at least one inductor wire, and the second vertical wire interposed therebetween.

13. The inductor component according to claim 1, further comprising:

when the vertical wire is a first vertical wire, the external terminal is a first external terminal, the portion of the first vertical wire is a first portion, the conducting portion is a first conducting portion, and the insulating portion is a first insulating portion, a second vertical wire extending from the at least one inductor wire in the thickness direction, the second vertical wire including a second portion exposed from the principal surface; and a second external terminal disposed on the principal surface to cover the second portion exposed from the principal surface, wherein the second external terminal includes a second conducting portion containing a metal, and a second insulating portion covering the second conducting portion, the second insulating portion having an insulating property higher than an insulating property of the second conducting portion, a DC electrical resistance of a portion from the first conducting portion to the second conducting portion with the first vertical wire, the at least one inductor wire, and the second vertical wire interposed therebetween is from 1 mΩ to 50 mΩ, and when an electric current is flowed through said portion, an inductance value is from 1 nH to 10 nH.

14. The inductor component according to claim 1, further comprising:

a support wire connected to the at least one inductor wire, the support wire having an end portion being exposed from the element body.

15. The inductor component according to claim 14, wherein a material of a portion of the support wire including an exposed surface of the support wire exposed from the element body is a metal oxide.

16. The inductor component according to claim 1, further comprising:

a dummy portion exposed outward on the principal surface, the dummy portion being not electrically connected to the at least one inductor wire.

17. The inductor component according to claim 16, wherein a material of a portion of the dummy portion including a surface of the dummy portion exposed from the principal surface is a metal oxide.

18. An inductor component comprising:

an element body having a principal surface;

at least one inductor wire extending in parallel with a long-side direction of the principal surface in an inside of the element body, the at least one inductor wire including at least one pad;

a vertical wire extending from the at least one inductor wire in a thickness direction orthogonal to the principal surface, the vertical wire including a portion exposed from the principal surface; and an external terminal disposed on the principal surface to cover the portion of the vertical wire exposed from the principal surface, the external terminal including a conducting portion including a metal, and an insulating portion covering the conducting portion and having a higher insulation property than an insulation property of the conducting portion, and the conducting portion being insulated from an outside of the element body by the insulating portion, wherein a center axis of the at least one pad is located on a different straight line than a center axis of the at least one inductor wire at a connecting site between the at least one pad and the at least one inductor wire.

19. The inductor component according to claim 1, wherein the at least one inductor wire includes at least one pad, and an area of the at least one pad is larger than an area of the vertical wire at a connecting site to the at least one pad.

20. The inductor component according to claim 18, wherein the at least one inductor wire includes at least one pad, and an area of the at least one pad is larger than an area of the vertical wire at a connecting site to the at least one pad.

* * * * *